(12) United States Patent
Tang et al.

(10) Patent No.: US 11,922,580 B2
(45) Date of Patent: Mar. 5, 2024

(54) FLOORPLAN GENERATION BASED ON ROOM SCANNING

(71) Applicant: Apple Inc., Cupertino, CA (US)

(72) Inventors: Feng Tang, Cupertino, CA (US); Afshin Dehghan, Sunnyvale, CA (US); Kai Kang, San Jose, CA (US); Yang Yang, Sunnyvale, CA (US); Yikang Liao, Sunnyvale, CA (US); Guangyu Zhao, Bejing (CN)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 17/146,604

(22) Filed: Jan. 12, 2021

(65) Prior Publication Data
US 2021/0225081 A1 Jul. 22, 2021

Related U.S. Application Data

(60) Provisional application No. 62/962,485, filed on Jan. 17, 2020.

(51) Int. Cl.
*G06T 19/00* (2011.01)
*G06F 18/21* (2023.01)
(Continued)

(52) U.S. Cl.
CPC .............. *G06T 19/00* (2013.01); *G06F 18/21* (2023.01); *G06F 18/2148* (2023.01); *G06F 18/217* (2023.01); *G06F 18/24* (2023.01); *G06N 3/045* (2023.01); *G06T 7/50* (2017.01); *G06T 7/73* (2017.01); *G06T 11/00* (2013.01); *G06T 15/205* (2013.01); *G06T 19/003* (2013.01);
(Continued)

(58) Field of Classification Search
CPC .......... G06T 19/003; G06T 7/50; G06T 7/73; G06T 11/00; G06T 15/205; G06T 19/20; G06T 2207/20081; G06T 2207/20084; G06T 2210/04; G06T 2210/12; G06T 2210/56; G06T 2207/10016; G06T 2207/10024; G06T 2207/10028; G06T 19/00; G06K 9/6217; G06K 9/6257; G06K 9/6262; G06K 9/6267; G06N 3/0454; G06N 3/08; G06N 5/003; G06V 10/22; G06V 20/10; G06V 20/36; G06V 30/274; G06V 20/64; H04N 7/183
See application file for complete search history.

(56) References Cited

U.S. PATENT DOCUMENTS 8,705,893 B1 * 4/2014 Zhang ..................... G06T 7/33
382/285
9,792,501 B1 10/2017 Maheriya et al.
(Continued)

OTHER PUBLICATIONS

Liu, C., Wu, J. and Furukawa, Y., 2018. Floornet: A unified framework for floorplan reconstruction from 3d scans. In Proceedings of the European conference on computer vision (ECCV) (pp. 201-217).*

(Continued)

*Primary Examiner* — Zhitong Chen
(74) *Attorney, Agent, or Firm* — Thompson Hine LLP

(57) ABSTRACT

Various implementations disclosed herein include devices, systems, and methods that generate floorplans and measurements using a three-dimensional (3D) representation of a physical environment generated based on sensor data.

20 Claims, 15 Drawing Sheets

(51) Int. Cl.

| | |
|---|---|
| *G06F 18/214* | (2023.01) |
| *G06F 18/24* | (2023.01) |
| *G06N 3/045* | (2023.01) |
| *G06T 7/50* | (2017.01) |
| *G06T 7/73* | (2017.01) |
| *G06T 11/00* | (2006.01) |
| *G06T 15/20* | (2011.01) |
| *G06T 19/20* | (2011.01) |
| *G06V 10/22* | (2022.01) |
| *G06V 20/00* | (2022.01) |
| *G06V 20/10* | (2022.01) |
| *G06V 20/64* | (2022.01) |
| *G06V 30/262* | (2022.01) |
| *H04N 7/18* | (2006.01) |

(52) U.S. Cl.
CPC ............. *G06T 19/20* (2013.01); *G06V 10/22* (2022.01); *G06V 20/10* (2022.01); *G06V 20/36* (2022.01); *G06V 20/64* (2022.01); *G06V 30/274* (2022.01); *H04N 7/183* (2013.01); *G06T 2207/20081* (2013.01); *G06T 2207/20084* (2013.01); *G06T 2210/04* (2013.01); *G06T 2210/12* (2013.01); *G06T 2210/56* (2013.01)

(56) References Cited

U.S. PATENT DOCUMENTS

| | | | |
|---|---|---|---|
| 9,866,815 | B2 | 1/2018 | Vrcelj et al. |
| 10,192,115 | B1 | 1/2019 | Sheffield et al. |
| 10,373,380 | B2 | 8/2019 | Kutliroff et al. |
| 10,387,582 | B2 | 8/2019 | Lewis et al. |
| 10,430,641 | B2 | 10/2019 | Gao |
| 10,460,180 | B2 | 10/2019 | Gao |
| 10,572,970 | B2 | 2/2020 | Sturm |
| 10,586,351 | B1 | 3/2020 | Brailovskiy |
| 10,972,638 | B1 | 4/2021 | Waschura |
| 10,981,272 | B1 | 4/2021 | Nagarajan |
| 2006/0077253 | A1 | 4/2006 | VanRiper et al. |
| 2014/0043436 | A1 | 2/2014 | Bell |
| 2014/0267228 | A1 | 9/2014 | Ofek |
| 2014/0301633 | A1 | 10/2014 | Furukawa |
| 2016/0055268 | A1 | 2/2016 | Bell |
| 2016/0092608 | A1 | 3/2016 | Yamamoto |
| 2016/0343140 | A1 | 11/2016 | Ciprari |
| 2017/0316115 | A1 | 11/2017 | Lewis |
| 2018/0260613 | A1 | 9/2018 | Gao |
| 2018/0315162 | A1 | 11/2018 | Sturm |
| 2018/0330184 | A1 | 11/2018 | Mehr |
| 2018/0336683 | A1 | 11/2018 | Feng |
| 2018/0336724 | A1 | 11/2018 | Spring et al. |
| 2019/0026958 | A1 | 1/2019 | Gausebeck |
| 2019/0038181 | A1 | 2/2019 | Domeika |
| 2019/0043259 | A1 | 2/2019 | Wang et al. |
| 2019/0130233 | A1 | 5/2019 | Stenger |
| 2019/0149745 | A1 | 5/2019 | Green |
| 2019/0155302 | A1 | 5/2019 | Lukierski |
| 2019/0164346 | A1 | 5/2019 | Kim |
| 2019/0340433 | A1 | 11/2019 | Frank |
| 2020/0074668 | A1 | 3/2020 | Stenger |
| 2020/0074707 | A1 | 3/2020 | Lee |
| 2020/0160487 | A1 | 5/2020 | Kanzawa |
| 2020/0174132 | A1 | 6/2020 | Nezhadarya |
| 2020/0184651 | A1 | 6/2020 | Mukasa |
| 2020/0211284 | A1 | 7/2020 | Lin |
| 2020/0349351 | A1 | 11/2020 | Brook |
| 2021/0019954 | A1 | 1/2021 | Trinh |
| 2021/0199809 | A1 | 7/2021 | Wynn |

OTHER PUBLICATIONS

Bylow, E., Maier, R., Kahl, F. and Olsson, C., Jun. 2019. Combining depth fusion and photometric stereo for fine-detailed 3d models. In Scandinavian Conference on Image Analysis (pp. 261-274). Springer, Cham.*
Turner, E. and Zakhor, A., Jan. 2014. Floor plan generation and room labeling of indoor environments from laser range data. In 2014 international conference on computer graphics theory and applications (GRAPP) (pp. 1-12). IEEE.*
Rahman, M.M., Tan, Y., Xue, J., Shao, L. and Lu, K., 2019. 3D object detection: Learning 3D bounding boxes from scaled down 2D bounding boxes in RGB-D images. Information Sciences, 476, pp. 147-158 (Rahman).*
Indovina, I., "Generating accurate floor plans from 3D scans," retrieved from the internet on Jun. 2, 2021: https://www.digitalbridge.com/blog/generating-accurate-floor-plans-from-3d-scans, 6 pages, Nov. 1, 2019.
Stojanovic, V. et al., "Generation of Approximate 2D and 3D Floor Plans from 3D Point Clouds," Proceedings of the 14th International Joint Conference on Computer Graphics Theory and Applications, pp. 177-184, Jan. 1, 2019.
Xu, Y. et al., "Depth Completion from Sparse LiDAR Data with Depth-Normal Constraints," 2019 IEEE/CVF International Conference on Computer Vision (ICCV), IEEE, pp. 2811-2820, Oct. 2019.
European Patent Office, Partial Search Report and Provisional Opinion, European Patent Application No. 21151661.2, 17 pages, dated Aug. 3, 2021.
United States Patent and Trademark Office, Notice of Allowance, U.S. Appl. No. 17/146,582, 10 pages, dated Aug. 17, 2022.
United States Patent and Trademark Office, Non-Final Office Action, U.S. Appl. No. 17/146,582, 17 pages, dated Apr. 4, 2022.
United States Patent and Trademark Office, Non-Final Office Action, U.S. Appl. No. 17/148,682, 14 pages, dated Oct. 27, 2022.
European Patent Office, Extended European Search Report and Search Opinion, European Patent Application No. 21151661.2, 16 pages, dated Oct. 28, 2021.
Hazirbas, C. et al., "FuseNet: Incorporating Depth into Semantic Segmentation via Fusion-based CNN Architecture," Advances in Databases and Information Systems, Springer International Publishing, 15 pages, 2017.
Song, S. and Xiao, J., "Sliding Shapes for 3D Object Detection in Depth Images," ICIAP: International Conference on Image Analysis and Processing, 17th International Conference, Naples, Italy, 18 pages, Sep. 9, 2013-Sep. 13, 2013.
European Patent Office, Examination Report (Communication pursuant to Article 94(3) EPC), European Patent Application No. 21151661.2, 5 pages, dated Jul. 13, 2022.
Sim, Daniel, "Real-Time 3D Reconstruction and Semantic Segmentation Using Multi-Layer Heightmaps", Master Thesis; Sep. 2, 2015; pp. 1-73.
Liu, Chen; WU, Jiaye, and FURUKAWA, Yasutaka, "FloorNet: A Unified Framework for Floorplan Reconstruction from 3D Scans", EECV 2018; https://link.springer.com/conference/eccv, pp. 1-17.
Bylow et al., Combing Depth Fusion and Photometric Stereo for Fine-Detailed 3D Models, Scandinavian Conference on Image Analysis; Springer Nature Switzerland AG; 2019; pp. 261-274.
Turner et al., A Floor Plan Generation Room Labeling of Indoor Environments from Laser Range Data; International Conference of Computer Graphics Theory and Application (GRAPP); IEEE; 2014; pp. 1-12.
U.S. Patent and Trademark Office, Notice of Allowance, U.S. Appl. No. 17/150,178, 8 pages, dated Feb. 16, 2023.
U.S. Patent and Trademark Office, Notice of Allowance, U.S. Appl. No. 17/150,178, 10 pages, dated Sep. 8, 2022.
Babacan, K. et al., "Semantic Segmentation of Indoor Point Clouds Using Convolutional Neural Network," ISPRS Annals of the Protogrammetry, Remote Sensing and Spatial Information Sciences, vol. IV-4/W4, 8 pages, 2014.
Hou, J. et al., "ED-SIS: 3D Semantic Instance Segmentation of RGB-D Scans," Proceedings of the IEEE/CVF Conference on Computer Vision and Pattern Recognitions, 10 pages, 2019.
Son, H. and Kim, C., "Semantic as-built 3D modeling of structural elements of building based on local concavity and convexity," Advanced Engineering Informatics, 34, pp. 114-124, 2017.

(56) References Cited

OTHER PUBLICATIONS

Wang, L. et al., "Multi-View Fusion-Based 3D Object Detection for Robot Indoor Scene Perception," Sensors, 19, p. 4092, 20 pages, 2019.

Xiong, X. et al., "Automatic creation of semantically rich 3D building models from laser scanner data," Automation in Constructions, 31, pp. 325-337, 2013.

U.S. Patent and Trademark Office; Final Office Action dated Mar. 16, 2023 which pertains to U.S. Appl. No. 17/148,682. 6 Pages.

U.S. Patent and Trademark Office; Non-Final Office Action dated Oct. 10, 2023 which pertains to U.S. Appl. No. 17/987,256, filed Nov. 15, 2022; 27 pgs.

European Patent Office, EP Extended Search Report dated Aug. 9, 2023 which pertains to European Patent Application No. 23178270.7. 13 pages.

Xu, et al., Depth Completion from Sparse LiDAR Data with Depth-Normal Constraints, 2019, 2019 IEEE/CVF International Conference on Computer Vision (ICCV); pp. 2811-2820.

Ignazio, Generating accurate floor plans from 3D scans, Nov. 2019, https://www.digitalbridge.com/blog/generating-accurate-floor-plans-from-3d-scans, 6 pages.

Stojanovic, et al., Generation of Approximate 2D and 3D Floor Plans from 3D Point Clouds, Jan. 2019, Proceedings of the 14th International Joint Conference on Computer Vision, Imaging and Computer Graphics Theory and Appilcations, pp. 177-184.

Liu, et al., FloorNet: A Unified Framework for Floorplan Reconstruction from 3D Scans, Oct. 2018, International Conference on Image Analysis and Processing, 17th International Conference, pp. 203-219.

Singh, et al., Locating 3D Object Proposals: A Depth-Based Online Approach, Sep. 2017, IEEE Trans. on Circuits and System for Video Technology, pp. 1-14.

Deng, et al., Amodal Detection of 3D Objects: Inferring 3D Bounding Boxes from 2D Ones in RGB-Depth Images, Jul. 2017, 2017 IEEE Conference on Computer Vision and Pattern Recognition, pp. 398-406.

Hazirbas, et al., FuseNet: Incorporating Depth into Semantic Segmentation via Fusion-based CNN Architecture, Jan. 2017, Springer International Publishing, pp. 1-15.

Song, et al., Sliding Shapes for 3D Object Detection in Depth Images, International Conference on Image Analysis and Processing, 17th International Conference, Sep. 2013, vol. 8694, pp. 634-651.

* cited by examiner

FLOORPLAN GENERATION BASED ON ROOM SCANNING

CROSS-REFERENCE TO RELATED APPLICATION

This application claims the benefit of U.S. Provisional Application Ser. No. 62/962,485 filed Jan. 17, 2020, which is incorporated herein in its entirety.

TECHNICAL FIELD

The present disclosure generally relates to generating two-dimensional and three-dimensional geometric representations of physical environments, and in particular, to systems, methods, and devices that generate geometric representations based on information detected in physical environments.

BACKGROUND

Floorplans play an important role in designing, understanding, and remodeling indoor spaces. Floorplans are generally effective in conveying geometric and semantic information of a physical environment. For instance, a user may view a floorplan to quickly identify room extents, wall structures and corners, the locations of doors and windows, and object arrangements.

There are numerous hurdles to providing computer-based systems to automatically generate floorplans, room measurements, or object measurements based on sensor data. The sensor data obtained regarding a physical environment (e.g., images and depth data) may be incomplete or insufficient to provide accurate floorplans and measurements. For example, indoor environments often contain an assortment of objects, such as lamps, desks, chairs, etc., that may hide the architectural lines of the room that might otherwise be used to detect edges of a room to build an accurate floorplan. As another example, images and depth data typically lack semantic information and floorplans and measurements generated without such data may lack accuracy.

Existing techniques do not allow for automatic, accurate, and efficient generation of floorplans and measurements using a mobile device, for example, based on a user capturing photos or video or other sensor data while walking about in a room. Moreover, existing techniques may fail to provide sufficiently accurate and efficient floorplans and measurements in real time (e.g., immediate floorplan/measurement during scanning) environments.

SUMMARY

Various implementations disclosed herein include devices, systems, and methods that generate floorplans and measurements using three-dimensional (3D) representations of a physical environment. The 3D representations of the physical environment may be generated based on sensor data, such as image and depth sensor data. The generation of floorplans and measurements is facilitated in some implementations using semantically-labelled 3D representations of a physical environment. Some implementations perform semantic segmentation and labeling of 3D point clouds of a physical environment. Techniques disclosed herein may achieve various advantages by using semantic 3D representations, such as a semantically labeled 3D point cloud, encoded onto a two-dimensional (2D) lateral domain. Using semantic 3D representations in 2D lateral domains may facilitate the efficient identification of structures used to generate a floorplan or measurement.

A floorplan may be provided in various formats. In some implementations, a floorplan includes a 2D top-down view of a room. A floorplan may graphically depict a boundary of a room, e.g., by graphically depicting walls, barriers, or other limitations of the extent of a room, using lines or other graphical features. A floorplan may graphically depict the locations and geometries of wall features such as wall edges, doors, and windows. A floorplan may graphically depict objects within a room, such as couches, tables, chairs, appliances, etc. A floorplan may include identifiers that identify the boundaries, walls, doors, windows, and objects in a room, e.g., including text labels or reference numerals that identify such elements. A floorplan may include indications of measurements of boundaries, wall edges, doors, windows, and objects in a room, e.g., including numbers designating a length of a wall, a diameter of a table, a width of a window, etc.

According to some implementations, a floorplan is created based on a user performing a room scan, e.g., moving a mobile device to capture images and depth data around the user in a room. Some implementations provide a preview of a preliminary 2D floorplan during the room scanning. For example, as the user walks around a room capturing the sensor data, the user's device may display a preview of a preliminary 2D floorplan that is being generated. The preview is "live" in the sense that it is provided during the ongoing capture of the stream or set of sensor data used to generate the preliminary 2D floorplan. To enable a live preview of the preliminary 2D floorplan, the preview may be generated (at least initially) differently than a final, post-scan floorplan. In one example, the preview is generated without certain post processing techniques (e.g., fine-tuning, corner correction, etc.) that are employed to generate the final, post-scan floorplan. In other examples, a live preview may use a less computationally intensive neural network than is used to generate the final, post-scan floorplan. The use of 2D semantic data (e.g., for different layers of the room) may also facilitate making the preview determination sufficiently efficient for live display.

In some implementations, a floorplan may be generated based on separately identifying wall structures (e.g., wall edges, door, and windows) and detecting bounding boxes for objects (e.g., furniture, appliances, etc.). The wall structures and objects may be detected separately and thus using differing techniques and the results combined to generate a floorplan that represents both the wall structures and the objects.

In some implementations, a floorplan creation process identifies wall structures (e.g., wall edges) based on a 2D representation that encodes 3D semantic data in multiple layers. For example, 3D semantic data may be segmented into a plurality of horizontal layers that are used to identify where the wall edges of the room are located.

According to some implementations, measurements of a room's wall attributes (e.g., walls, doors, and windows) and objects (e.g., furniture, appliances, etc.) may be acquired using different techniques. For example, for wall attributes, such as doors and windows, light intensity images (e.g., RGB images) may be utilized to generate boundaries (2D polygonal shapes) in addition to or instead of depth data. This may provide various advantages, for example, in circumstances in which depth data may be skewed due to the transparency of windows and doors that may include windows. After the 2D polygonal shapes are determined from the light intensity images, depth data or 3D representations based on the depth data (e.g., a 3D semantic point cloud) can then be used to determine specific measurements of the door or window. In some implementations, objects are measured by first generating 3D bounding boxes for the object based on the depth data, refining the bounding boxes using various neural networks and refining algorithms described herein, and acquiring measurements based on the refined bounding boxes and the associated 3D data points for the respective bounding boxes.

Some implementations of this disclosure involve an exemplary method of generating and displaying a live preview of a preliminary 2D floorplan. The exemplary method first involves displaying, at an electronic device having a processor (e.g., a smart phone), a live camera image feed (e.g., live video) comprising a sequence of images of a physical environment. For example, as a user captures video while walking around a room to capture images of different parts of the room from multiple perspectives, these images are displayed live on a mobile device so that the user sees what he/she is capturing.

The exemplary method further involves obtaining a 3D representation of a physical environment generated based on depth data and light intensity data obtained during the displaying of the live camera feed. For example, a 3D point cloud may be generated based on depth camera information received concurrently with the images.

The exemplary method further involves generating a live preview of a preliminary 2D floorplan of the physical environment based on the 3D representation of the physical environment. For example, semantic information may be included in or associated with the 3D point cloud and 2D semantic data (e.g., in layers) may be generated from the 3D point cloud semantics. Additionally, the 2D semantic data may be used to identify walls and wall attributes or features (e.g., doors and windows) for the live preview. Moreover, representations of objects in the live preview may be generated based on 3D bounding boxes determined using the 3D point cloud.

The exemplary method further involves displaying the live preview of the preliminary 2D floorplan concurrently with the live camera feed. For example, while a user is seeing a live camera feed of the room environment, another viewing window with the 2D floorplan as it is being generated may be overlaid on top of the live camera feed (e.g., Picture-In-Picture (PIP)).

In some implementations, the exemplary method further involves generating a final 2D floorplan of the physical environment based on the 3D representation, where generating the final 2D floorplan uses a different process than generating the live preview of the preliminary 2D floorplan. For example, the different process may use a more computationally-intensive neural network with fine-tuning (e.g., corner correction), etc. In some implementations, the different process includes classifying corners and small walls based on the 3D representation using a more computationally-intensive neural network, generating a transitional 2D floorplan based on the classified corners and small walls, determining refinements for the transitional 2D floorplan using a standardization algorithm, and generating a final 2D floorplan of the physical environment based on the determined refinements for the transitional 2D floorplan.

In some implementations, the exemplary method further involves generating the live preview of the preliminary 2D floorplan by generating an edge map by identifying walls in the physical environment based on the 3D representation, updating the edge map by identifying wall attributes (e.g., doors and windows) in the physical environment based on the 3D representation, updating the edge map by identifying objects in the physical environment based on the 3D representation, and generating the live preview of the preliminary 2D floorplan based on the updated edge map that includes the identified walls, identified wall attributes, and identified objects. In some implementations, generating the live preview of the 2D floorplan includes generating 2D semantic data for multiple horizontal layers of the physical environment based on the 3D representation, and generating the 2D floorplan using the 2D semantic data. For example, each layer provides x, y semantics for a range of z values, e.g., the first layer may be the most common semantic label for each x, y location for the z value range 0-10.

In some implementations, generating the edge map by identifying walls further includes determining parametrically-refined lines for the edge map using a line fitting algorithm, and updating the edge map based on the parametrically-refined lines. In some implementations, updating the edge map by identifying wall attributes includes determining boundaries for the identified wall attributes using a wall attribute neural network and the sequence of images of the live camera feed (e.g., RGB data for transparent windows), and generating refined boundaries using a polygon heuristics algorithm based on the 3D representation associated with the identified wall attributes. In some implementations, updating the edge map by identifying objects includes generating 3D bounding boxes corresponding to the identified objects in the physical environment based on the 3D representation, and generating 2D representations (e.g., furniture icons or flat 2D bounding boxes) of the 3D bounding boxes.

In some implementations, the 3D representation is associated with 3D semantic data that includes a 3D point cloud that includes semantic labels associated with at least a portion of 3D points within the 3D point cloud. Additionally, in some implementations, the semantic labels identify walls, wall attributes (e.g., doors and windows), objects, and classifications of the objects of the physical environment.

Some implementations of this disclosure involve an exemplary method of generating and displaying a 2D floorplan. The exemplary method first involves obtaining a 3D representation of a physical environment generated based on depth data and light intensity image data obtained during a scanning process. For example, a 3D point cloud may be generated based on depth camera information received concurrently with the images during a room scan. For example, algorithms may be used for semantic segmentation and labeling of 3D point clouds of indoor scenes, where objects in point clouds can have significant variations and complex configurations.

The exemplary method further involves detecting positions of wall structures in the physical environment based on the 3D representation. For example, walls may be identified by generating 2D semantic data (e.g., in layers), using the 2D semantic data to generate an edge map using a neural network, and determining vector parameters to standardize the edge map in a 3D normalized plan. Wall attributes or wall attributes (e.g., doors/windows) may be identified based on RGB images and depth data to generate polygon boundaries. This technique for doors and windows provides advantages, especially due to transparency of windows which may create noise/errors in depth data.

The exemplary method further involves generating bounding boxes corresponding to objects in the physical environment based on the 3D representation. For example, the 3D bounding boxes may provide location, pose (e.g., location and orientation), and shape of each piece furniture and appliance in the room. Bounding boxes may be refined using RGB data and novel multi-network adjustment techniques (e.g., 2-stage neural network fine-tuning for low precision/high recall and high precision/low recall).

The exemplary method further involves displaying a 2D floorplan providing a view (e.g., top down) of the physical environment. In some implementations, the 2D floorplan is determined based on the positions of the wall structures and the bounding boxes corresponding to the objects.

In some implementations, detecting positions of wall structures in the physical environment based on the 3D representation includes identifying walls and wall attributes (e.g., doors and windows) of the physical environment from the wall structures based on the 3D representation, and generating an edge map of the identified walls and the wall attributes based on the 3D representation, wherein the 2D floorplan is based on the generated edge map that includes the identified walls and identified wall attributes. In some implementations, the exemplary method further involves classifying corners and small walls based on the 3D representation using a more computationally-intensive neural network, generating a transitional 2D floorplan based on the classified corners and small walls, determining refinements for the transitional 2D floorplan using a standardization algorithm, and generating a final 2D floorplan of the physical environment based on the determined refinements for the transitional 2D floorplan. In some implementations, the exemplary method further involves determining boundaries for the identified wall structures using a wall structure neural network and light intensity image data (e.g., RGB data) obtained during the scanning process, and generating refined boundaries using a polygon heuristics algorithm based on the 3D semantic data associated with the identified wall attributes.

In some implementations, the bounding boxes are refined bounding boxes, and the exemplary method further involves generating a refined bounding box for an object by generating a proposed bounding box using a first neural network, and generating the refined bounding box by identifying features of the object using a second neural network (e.g., low precision/high recall to generate features of the object) and refining the proposed bounding box using a third neural network (e.g., high precision/low recall to refine the accuracy of the generated features and output a refined bounding box) based on the identified features. In some implementations, the first neural network generates the proposed bounding box based on the 3D representation associated with the object. In some implementations, the second neural network identifies the features of the object based on the 3D representation associated with the object and light intensity image data (e.g., RGB data) obtained during the scanning process. In some implementations, the third neural network is trained to refine the accuracy of the identified features from the second neural network and output a refined bounding box based on the 3D representation associated with the object and light intensity image data (e.g., RGB data) obtained during the scanning process. In some implementations, the bounding boxes provide location information, pose information (e.g., location and orientation information), and shape information for the objects in the physical environment.

In some implementations, the 3D representation is associated with 3D semantic data that includes a 3D point cloud that includes semantic labels associated with at least a portion of 3D points within the 3D point cloud. Additionally, in some implementations, the semantic labels identify walls, wall attributes (e.g., doors and windows), objects, and classifications of the objects of the physical environment.

Some implementations of this disclosure involve an exemplary method of providing a floorplan based on 2D semantic data. The exemplary method first involves obtaining 3D semantic data of a physical environment generated based on depth data and light intensity image data obtained during a scanning process. For example, a 3D point cloud may be generated based on depth camera information received concurrently with the images during a room scan. For example, algorithms may be used for semantic segmentation and labeling of 3D point clouds of indoor scenes, where objects in point clouds can have significant variations and complex configurations.

The exemplary method further involves generating 2D semantic data for multiple horizontal layers of the physical environment based on the 3D semantic data. For example, each layer provides x, y semantics for a range of z values, e.g., the first layer may be the most common semantic label for each x, y location for the z value range 0-10.

The exemplary method further involves providing a floorplan based on generating an edge map using the 2D semantic data, where the floorplan provides a view (e.g., top down) of the physical environment. In some implementations, generating the edge map may involve determining a parametric representation and/or vector parameters to standardize the edge map in a 3D normalized plan.

In some implementations, providing the floorplan further includes generating the edge map by identifying walls in the physical environment based on the 2D semantic data for multiple horizontal layers, updating the edge map by identifying wall attributes (e.g., doors and windows) in the physical environment based on the 3D semantic data, updating the edge map by identifying objects in the physical environment based on the 3D semantic data, and generating the floorplan based on the updated edge map that includes the identified walls, identified wall attributes, and identified objects.

In some implementations, the identified walls are floor-to-ceiling walls (e.g., not cubicle walls), where identifying floor-to-ceiling walls based on the 2D semantic data for multiple horizontal layers includes identifying a floor of the physical environment having a lowest level of the multiple horizontal layers, identifying a ceiling of the physical environment having a highest level of the multiple horizontal layers, determining that a particular identified wall is a not a floor-to-ceiling wall (e.g., cubicle wall) based on a height of the particular identified wall does not meet a height threshold compared to a height of the ceiling, and updating the edge map by removing the particular identified wall from the edge map. In some implementations, generating the edge map by identifying walls further includes determining parametrically refined lines for the edge map using a line fitting algorithm, and updating the edge map based on the parametrically refined lines. In some implementations, updating the edge map by identifying wall attributes includes determining boundaries for the identified wall attributes using a wall attribute neural network and a light intensity image obtained during the scanning process (e.g., RGB data for transparent windows), and generating refined boundaries using a polygon heuristics algorithm based on the 3D semantic data associated with the identified wall attributes.

In some implementations, updating the edge map by identifying objects includes generating 3D bounding boxes corresponding to the identified objects in the physical environment based on the 3D semantic data, and generating 2D representations (e.g., furniture icons or flat 2D bounding boxes) of the 3D bounding boxes. In some implementations, the bounding boxes are refined bounding boxes, and generating a refined bounding box for an object includes generating a proposed bounding box using a first neural network, and generating the refined bounding box by identifying features of the object using a second neural network (e.g., low precision/high recall to generate features of the object) and refining the proposed bounding box using a third neural network (e.g., high precision/low recall to refine the accuracy of the generated features and output a refined bounding box) based on the identified features.

In some implementations, the 3D semantic data includes semantic labels associated with at least a portion of 3D points within a 3D point cloud representation of the physical environment. In some implementations, the semantic labels identify walls, wall attributes (e.g., doors and windows), objects, and classifications of the objects of the physical environment.

Some implementations of this disclosure involve an exemplary method of providing measurement data for objects and wall structures within a physical environment. The exemplary method first involves obtaining a 3D representation of a physical environment that was generated based on depth data obtained during a scanning process. For example, a 3D point cloud may be generated based on depth camera information received concurrently with the images. In some implementations, the 3D representation is associated with 3D semantic data. For example, algorithms may be used for semantic segmentation and labeling of 3D point clouds of indoor scenes, where objects in point clouds can have significant variations and complex configurations.

The exemplary method further involves generating 2D boundaries of a wall attribute (e.g., doors and windows) in the physical environment based on light intensity images (e.g., RGB images) of the physical environment.

The exemplary method further involves providing a measurement of the wall attribute based on the 2D boundaries and the 3D representation. For example, the 3D representation is used to determine how deep and/or wide a wall attribute such as a door or window is given a 2D polygonal shape associated with the wall attribute.

The exemplary method further involves generating a 3D bounding box corresponding to an object in the physical environment based on the 3D representation. For example, the 3D bounding boxes may provide location, pose (e.g., location and orientation), and shape of each piece furniture and appliance in the room. Bounding boxes may be refined using RGB data and novel multi-network adjustment techniques.

The exemplary method further involves providing a measurement of the 3D bounding box representing a measurement of the corresponding object. For example, length, width, height of the bounding box corresponding to length, width, and height of an object.

In some implementations, the bounding boxes are refined bounding boxes, and the exemplary method further involves generating a refined bounding box for an object by generating a proposed bounding box using a first neural network, and generating the refined bounding box by identifying features of the object using a second neural network (e.g., low precision/high recall to generate features of the object) and refining the proposed bounding box using a third neural network (e.g., high precision/low recall to refine the accuracy of the generated features and output a refined bounding box) based on the identified features. In some implementations, the first neural network generates the proposed bounding box based on the 3D representation associated with the object. In some implementations, the second neural network identifies the features of the object based on the 3D representation associated with the object and light intensity image data (e.g., RGB data) obtained during the scanning process. In some implementations, the third neural network is trained to refine the accuracy of the identified features from the second neural network and output a refined bounding box based on the 3D representation associated with the object and light intensity image data (e.g., RGB data) obtained during the scanning process. In some implementations, the bounding boxes provide location information, pose information (e.g., location and orientation information), and shape information for the objects in the physical environment.

In some implementations, the exemplary method further involves generating refined boundaries of the wall attributes using a polygon heuristics algorithm based on the 3D semantic data associated with the wall attributes. In some implementations, the wall attributes include a door or a window.

In some implementations, a measurement of a boundary associated with a measurement of a particular wall attribute includes a length, a width, and a height of the particular wall attribute. For example, the length, width, and height of a door. In some implementations, measurements of a 3D bounding box for a particular object include a length, a width, and a height that correspond to a length, a width, and a height of the particular object. For example, the length, width, and height of a bounding box generated for a table or a chair in the room.

In some implementations, the 3D representation comprises a 3D point cloud and the associated 3D semantic data includes semantic labels associated with at least a portion of 3D points within the 3D point cloud. In some implementations, the semantic labels identify walls, wall attributes (e.g., doors and windows), objects, and classifications of the objects of the physical environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
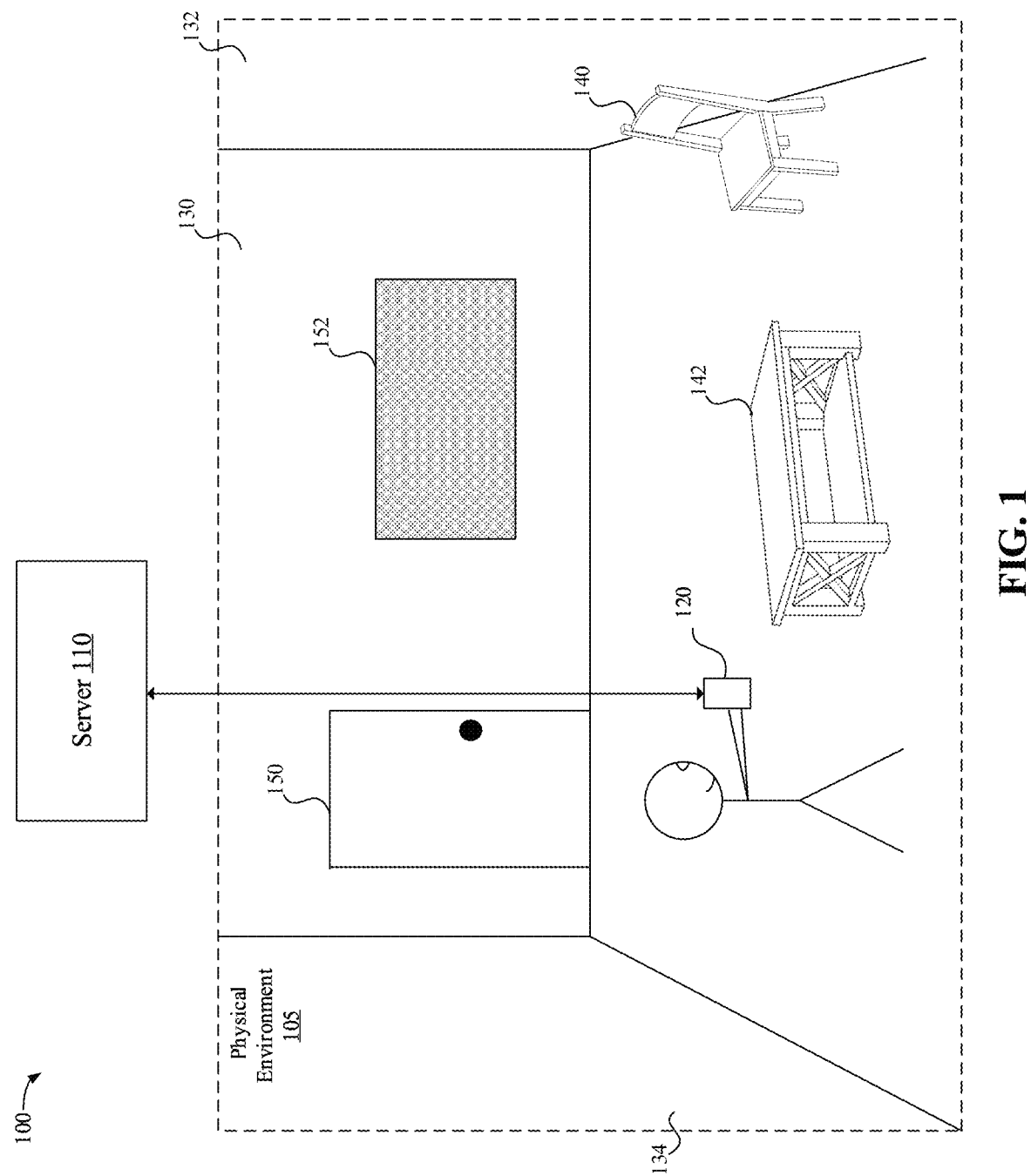
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes walls 130, 132, 134, chair 140, table 142, door 150, and window 152. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user wears the device 120 on his/her head. As such, the device 120 may include one or more displays provided to display content. For example, the device 120 may enclose the field-of-view of the user. In some implementations, the device 120 is replaced with a chamber, enclosure, or room configured to present content in which the user does not wear or hold the device 120.

Figure 2:
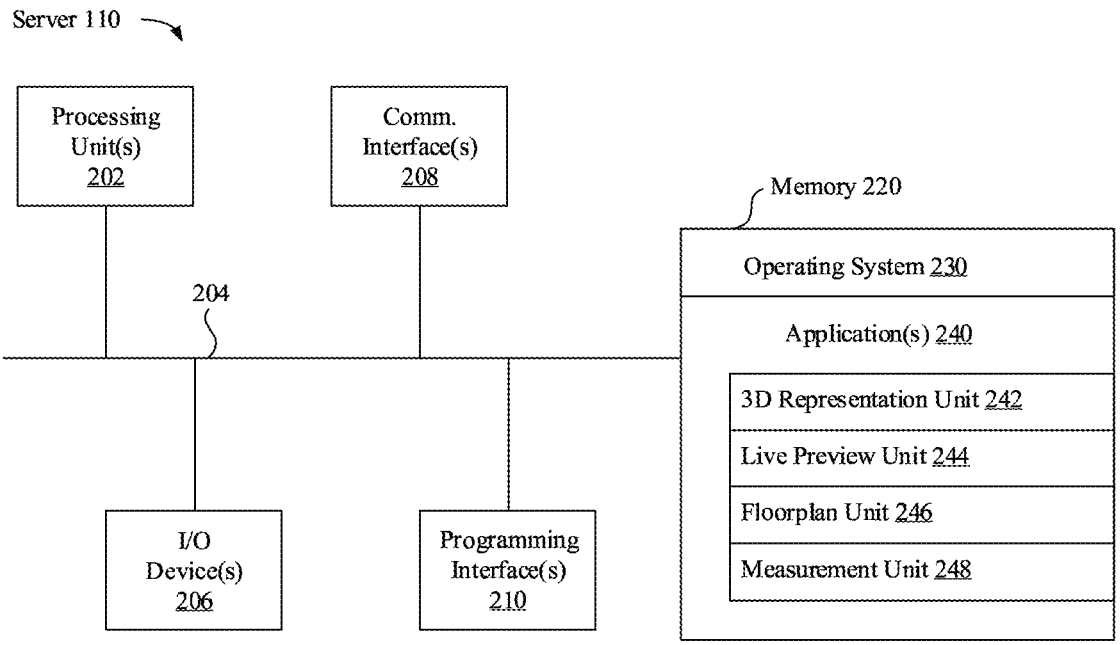
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a 3D representation unit 242, a live preview unit 244, a floorplan unit 246, and a measurement unit 248. The 3D representation unit 242, the live preview unit 244, the floorplan unit 246, and the measurement unit 248 can be combined into a single application or unit or separated into one or more additional applications or units.

The 3D representation unit 242 is configured with instructions executable by a processor to obtain image data (e.g., light intensity data, depth data, etc.) and integrate (e.g., fuse) the image data using one or more of the techniques disclosed herein. For example, the 3D representation unit 242 fuses RGB images from a light intensity camera with a sparse depth map from a depth camera (e.g., time-of-flight sensor) and other sources of physical environment information to output a dense depth point cloud of information. Additionally, the 3D representation unit 242 is configured with instructions executable by a processor to obtain light intensity image data (e.g., RGB) and perform a semantic segmentation algorithm to assign semantic labels to recognized features in the image data and generate semantic image data (e.g., RGB-S) using one or more of the techniques disclosed herein. The 3D representation unit 242 is further configured with instructions executable by a processor to obtain light intensity image data (e.g., RGB) and depth image data and generate a semantic 3D representation (e.g., a 3D point cloud with associated semantic labels) using one or more of the techniques disclosed herein. In some implementations, the 3D representation unit 242 includes separate units, such as an integration unit to generate the 3D point cloud data, a semantic unit for semantic segmentation based on light intensity data (e.g., RGB-S), and a semantic 3D unit to generate the semantic 3D representation, as further discussed herein with reference to FIG. 4.

The live preview unit 244 is configured with instructions executable by a processor to generate and display a live preview of a 2D floorplan of a physical environment based on a 3D representation (e.g., a 3D point cloud, a 3D mesh reconstruction, a semantic 3D point cloud, etc.) of the physical environment using one or more of the techniques disclosed herein. The 2D floorplan preview is then overlaid onto the live camera feed for a picture-in-picture display on a device. For example, the live preview unit 244 obtains a sequence of light intensity images from a light intensity camera (e.g., a live camera feed), a semantic 3D representation (e.g., semantic 3D point cloud) generated from the 3D representation unit 242, and other sources of physical environment information (e.g., camera positioning information from a camera's simultaneous localization and mapping (SLAM) system) to output a 2D floorplan image that is iteratively updated with the sequence of light intensity images. To generate the 2D floorplan, the live preview unit 244 is configured with instructions executable by a processor to generate an edge map of walls identified in the sequence of light intensity images based on the semantic 3D representation and perform post processing using a line fitting algorithm. The live preview unit 244 is further configured with instructions executable by a processor to identify wall attributes (e.g., doors and windows) in the sequence of light intensity images based on the semantic 3D representation and perform post processing using a fine-tuning algorithm technique further disclosed herein.

The live preview unit 244 may also be configured with instructions executable by a processor to identify objects (e.g., furniture, appliances, etc.) in the sequence of light intensity images based on the semantic 3D representation, generate bounding boxes for each identified object, and perform post processing using a fine-tuning algorithm technique further disclosed herein.

The live preview unit 244 generates the 2D floorplan from the edge map, the identified boundaries of the wall attributes, and the bounding boxes of the identified objects using one or more processes further disclosed herein.

Figure 6:
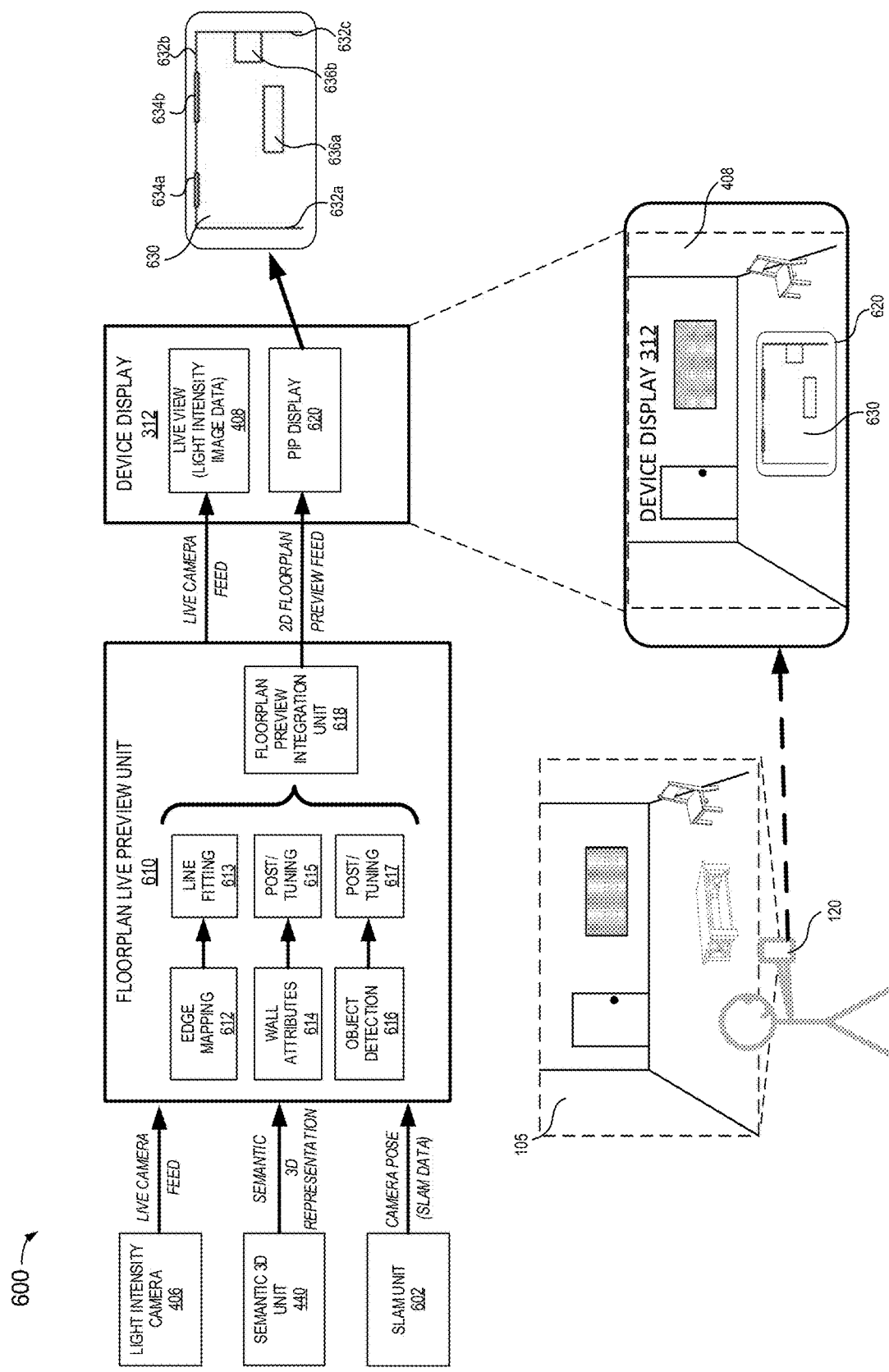
FIG. 6 is a system flow diagram of an example generation of a live preview of a 2D floorplan of a physical environment based on a 3D representation of the physical environment according to some implementations.

In some implementations, the live preview unit 244 includes separate units, such as an edge mapping unit and associated post processing unit to identify walls and generate and fine-tune an edge map, a wall attributes unit and associated post processing unit to identify and fine-tune boundaries for each wall attribute identified, an object detection unit and associated post processing unit to identify and fine-tune bounding boxes for each object identified, and a floorplan preview unit to generate the 2D floorplan as further discussed herein with reference to FIG. 6.

The floorplan unit 246 is configured with instructions executable by a processor to generate and display a 2D floorplan of a physical environment based on a 3D representation (e.g., a 3D point cloud, a 3D mesh reconstruction, a semantic 3D point cloud, etc.) of the physical environment using one or more of the techniques disclosed herein. For example, the floorplan unit 246 obtains a sequence of light intensity images from a light intensity camera (e.g., a live camera feed), a semantic 3D representation (e.g., semantic 3D point cloud) generated from the 3D representation unit 242, and other sources of physical environment information (e.g., camera positioning information from a camera's SLAM system) to output a finalized 2D floorplan image (e.g., a standardized and normalized floorplan). Additionally, the floorplan unit 246 generates an edge map of walls identified in the sequence of light intensity images based on the semantic 3D representation and perform post processing using a line fitting algorithm technique and corner fine-tuning using a small walls neural network further disclosed herein. The live preview unit 244 is further configured with instructions executable by a processor to identify wall attributes (e.g., doors and windows) in the sequence of light intensity images and perform post processing using a fine-tuning algorithm technique based on the semantic 3D representation further disclosed herein. The floorplan unit 246 is also configured with instructions executable by a processor to identify objects (e.g., furniture, appliances, etc.) in the sequence of light intensity images based on the semantic 3D representation, generate bounding boxes for each identified object, and perform post processing using a 2-stage fine-tuning neural network technique further disclosed herein. The floorplan unit 246 is further configured with instructions executable by a processor to generate a finalized 2D floorplan from the edge map, the identified boundaries of the wall attributes, and the bounding boxes of the identified objects using one or more processes further disclosed herein.

In some implementations, the floorplan unit 246 is further configured with instructions executable by a processor to generate measurement data based on the 3D representation for the walls identified on the edge map, measurement data for the identified boundaries of the wall attributes, and measurement data for the bounding boxes of the identified objects using one or more processes further disclosed herein.

In some implementations, the floorplan unit 246 includes separate units, such as an edge mapping unit and associated post processing unit to identify walls and generate and fine-tune an edge map with small walls and corners, a wall attributes unit and associated post processing unit to identify and fine-tune boundaries for each wall attribute identified, an object detection unit and associated post processing unit to identify and fine-tune bounding boxes for each object identified, a floorplan finalization unit to generate the standardized 2D floorplan, and a measurement unit to generate measurement data, as further discussed herein with reference to FIGS. 8 and 12.

The measurement unit 248 is configured with instructions executable by a processor to generate measurement data based on the 3D representation (e.g., a 3D point cloud, a 3D mesh reconstruction, a semantic 3D point cloud, etc.) for the walls identified on the edge map, measurement data for the identified boundaries of the wall attributes, and measurement data for the bounding boxes of the identified objects using one or more techniques disclosed herein. For example, the measurement unit 248 obtains a finalized edge map and associated depth data for the walls, 2D outlines and associated depth data for identified wall attributes, and bounding boxes (e.g., refined bounding boxes) for identified objects from the floorplan unit 244. The measurement unit 248 is configured with instructions executable by a processor to generate measurement data based on the 3D representation for the walls identified on the edge map, measurement data for the identified boundaries of the wall attributes, and measurement data for the bounding boxes of the identified objects using one or more processes further disclosed herein with reference to FIGS. 8 and 12.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
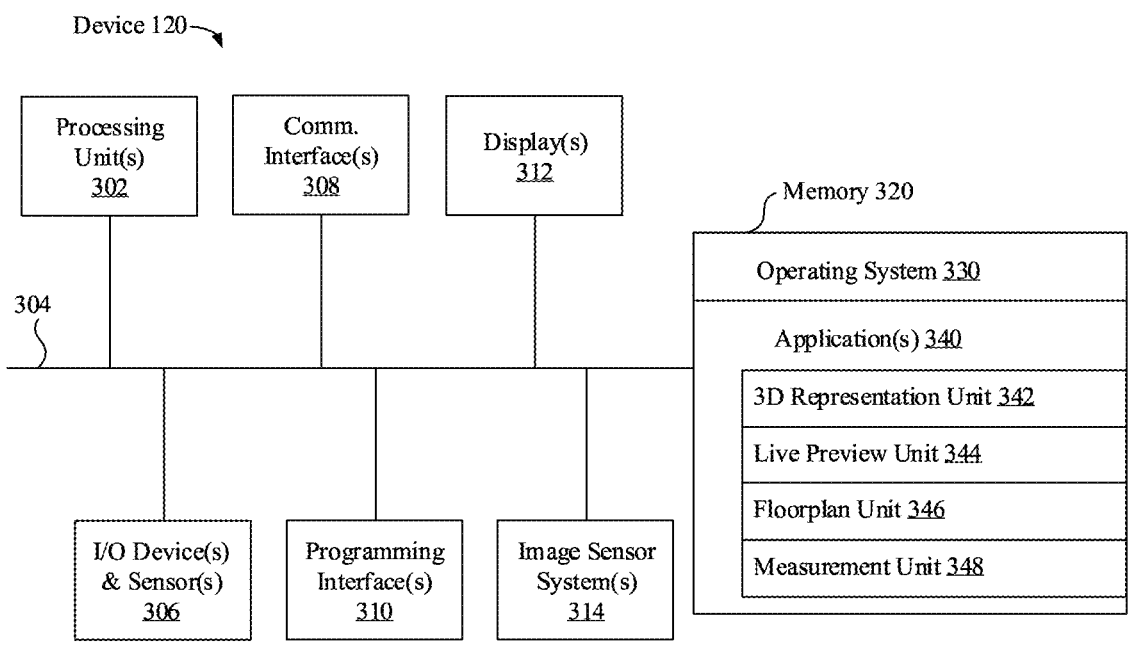
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like.

In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users). The applications 340 include include a 3D representation unit 342, a live preview unit 344, a floorplan unit 346, and a measurement unit 348. The 3D representation unit 342, the live preview unit 344, the floorplan unit 346, and the measurement unit 348 can be combined into a single application or unit or separated into one or more additional applications or units.

The 3D representation unit 342 is configured with instructions executable by a processor to obtain image data (e.g., light intensity data, depth data, etc.) and integrate (e.g., fuse) the image data using one or more of the techniques disclosed herein. For example, the 3D representation unit 342 fuses RGB images from a light intensity camera with a sparse depth map from a depth camera (e.g., time-of-flight sensor) and other sources of physical environment information to output a dense depth point cloud of information. Additionally, the 3D representation unit 342 is configured with instructions executable by a processor to obtain light intensity image data (e.g., RGB) and perform a semantic segmentation algorithm to assign semantic labels to recognized features in the image data and generate semantic image data (e.g., RGB-S) using one or more of the techniques disclosed herein. The 3D representation unit 342 is further configured with instructions executable by a processor to obtain light intensity image data (e.g., RGB) and depth image data and generate a semantic 3D representation (e.g., a 3D point cloud with associated semantic labels) using one or more of the techniques disclosed herein. In some implementations, the 3D representation unit 342 includes separate units, such as an integration unit to generate the 3D point cloud data, a semantic unit for semantic segmentation based on light intensity data (e.g., RGB-S), and a semantic 3D unit to generate the semantic 3D representation, as further discussed herein with reference to FIG. 4.

The live preview unit 344 is configured with instructions executable by a processor to generate and display a live preview of a 2D floorplan of a physical environment based on a 3D representation (e.g., a 3D point cloud, a 3D mesh reconstruction, a semantic 3D point cloud, etc.) of the physical environment using one or more of the techniques disclosed herein. The 2D floorplan is then overlaid onto the live camera feed for a picture-in-picture display. For example, the live preview unit 344 obtains a sequence of light intensity images from a light intensity camera (e.g., a live camera feed), a semantic 3D representation (e.g., semantic 3D point cloud) generated from the 3D representation unit 342, and other sources of physical environment information (e.g., camera positioning information from a camera's simultaneous localization and mapping (SLAM) system) to output a 2D floorplan image that is iteratively updated with the sequence of light intensity images. To generate the 2D floorplan, the live preview unit 344 is configured with instructions executable by a processor to generate an edge map of walls identified in the sequence of light intensity images based on the semantic 3D representation and perform post processing using a line fitting algorithm technique further disclosed herein. The live preview unit 344 is further configured with instructions executable by a processor to identify wall attributes (e.g., doors and windows) in the sequence of light intensity images based on the semantic 3D representation and perform post processing using a fine-tuning algorithm technique further disclosed herein.

The live preview unit 344 may also be configured with instructions executable by a processor to identify objects (e.g., furniture, appliances, etc.) in the sequence of light intensity images based on the semantic 3D representation, generate bounding boxes for each identified object, and perform post processing using a fine-tuning algorithm technique further disclosed herein.

The live preview unit 344 generates the 2D floorplan from the edge map, the identified boundaries of the wall attributes, and the bounding boxes of the identified objects using one or more processes further disclosed herein.

In some implementations, the live preview unit 344 includes separate units, such as an edge mapping unit and associated post processing unit to identify walls and generate and fine-tune an edge map, a wall attributes unit and associated post processing unit to identify and fine-tune boundaries for each wall attribute identified, an object detection unit and associated post processing unit to identify and fine-tune bounding boxes for each object identified, and a floorplan preview unit to generate the 2D floorplan as further discussed herein with reference to FIG. 6.

The floorplan unit 346 is configured with instructions executable by a processor to generate and display a 2D floorplan of a physical environment based on a 3D representation (e.g., a 3D point cloud, a 3D mesh reconstruction, a semantic 3D point cloud, etc.) of the physical environment using one or more of the techniques disclosed herein. For example, the floorplan unit 346 obtains a sequence of light intensity images from a light intensity camera (e.g., a live camera feed), a semantic 3D representation (e.g., semantic 3D point cloud) generated from the 3D representation unit 342, and other sources of physical environment information (e.g., camera positioning information from a camera's SLAM system) to output a finalized 2D floorplan image (e.g., a standardized and normalized floorplan). Additionally, the floorplan unit 346 is configured with instructions executable by a processor to generate an edge map of walls identified in the sequence of light intensity images based on the semantic 3D representation and perform post processing using a line fitting algorithm technique and corner fine-tuning using a small walls neural network further disclosed herein. The live preview unit 344 is also configured with instructions executable by a processor to identify wall attributes (e.g., doors and windows) in the sequence of light intensity images and perform post processing using a fine-tuning algorithm technique based on the semantic 3D representation further disclosed herein.

The floorplan unit 346 is also configured with instructions executable by a processor to identify objects (e.g., furniture, appliances, etc.) in the sequence of light intensity images based on the semantic 3D representation, generate bounding boxes for each identified object, and perform post processing using a 2-stage fine-tuning neural network technique further disclosed herein.

The floorplan unit 346 is further configured with instructions executable by a processor to generate a finalized 2D floorplan from the edge map, the identified boundaries of the wall attributes, and the bounding boxes of the identified objects using one or more processes further disclosed herein.

In some implementations, the floorplan unit 346 is further configured with instructions executable by a processor to generate measurement data based on the 3D representation for the walls identified on the edge map, measurement data for the identified boundaries of the wall attributes, and measurement data for the bounding boxes of the identified objects using one or more processes further disclosed herein.

In some implementations, the floorplan unit 346 includes separate units, such as an edge mapping unit and associated post processing unit to identify walls and generate and fine-tune an edge map with small walls and corners, a wall attributes unit and associated post processing unit to identify and fine-tune boundaries for each wall attribute identified, an object detection unit and associated post processing unit to identify and fine-tune bounding boxes for each object identified, a floorplan finalization unit to generate the standardized 2D floorplan, and a measurement unit to generate measurement data, as further discussed herein with reference to FIGS. 8 and 12.

The measurement unit 348 is configured with instructions executable by a processor to generate measurement data based on the 3D representation for the walls identified on the edge map, measurement data for the identified boundaries of the wall attributes, and measurement data for the bounding boxes of the identified objects using one or more techniques disclosed herein. For example, the measurement unit 348 obtains a finalized edge map and associated depth data for the walls, 2D outlines and associated depth data for identified wall attributes, and bounding boxes (e.g., refined bounding boxes) for identified objects from the floorplan unit 344. The measurement unit 348 is configured with instructions executable by a processor to generate measurement data based on the 3D representation for the walls identified on the edge map, measurement data for the identified boundaries of the wall attributes, and measurement data for the bounding boxes of the identified objects using one or more processes further disclosed herein with reference to FIGS. 8 and 12.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
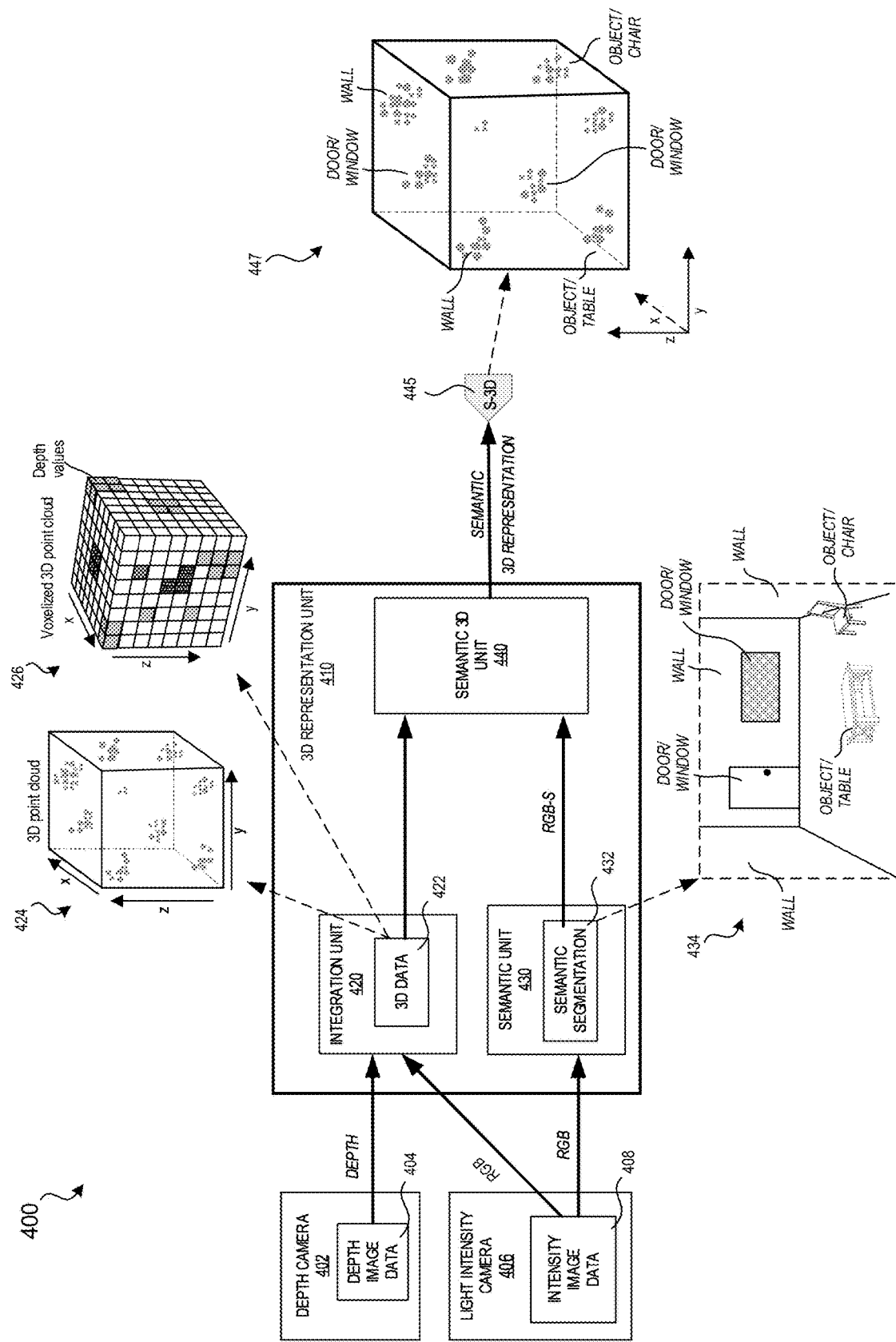
FIG. 4 is a system flow diagram of an example generation of a semantic three-dimensional (3D) representation using 3D data and semantic segmentation based on depth and light intensity image information according to some implementations.

FIG. 4 is a system flow diagram of an example environment 400 in which a system can generate a semantic 3D representation using 3D data and semantic segmentation data based on depth and light intensity image information detected in the physical environment. In some implementations, the system flow of the example environment 400 is performed on a device (e.g., server 110 or device 120 of FIGS. 1-3), such as a mobile device, desktop, laptop, or server device. The system flow of the example environment 400 can be displayed on a device (e.g., device 120 of FIGS. 1 and 3) that has a screen for displaying images and/or a screen for viewing stereoscopic images such as a head-mounted display (HMD). In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires image data of a physical environment (e.g., the physical environment 105 of FIG. 1) and the 3D representation unit 410 (e.g., 3D representation unit 242 of FIG. 2, and/or 3D representation unit 342 of FIG. 3) generates a semantic 3D representation 445 representing the surfaces in a 3D environment using a 3D point cloud with associated semantic labels. In some implementations, the semantic 3D representation 445 is a 3D reconstruction mesh using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., wall 130, door 150, chair 140, table 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In an example implementation, the environment 400 includes an image composition pipeline that acquires or obtains data (e.g., image data from image source(s)) for the physical environment. Example environment 400 is an example of acquiring image data (e.g., light intensity data and depth data) for a plurality of image frames. The image source(s) may include a depth camera 402 that acquires depth data 404 of the physical environment, and a light intensity camera 406 (e.g., RGB camera) that acquires light intensity image data 408 (e.g., a sequence of RGB image frames).

The 3D representation unit 410 includes an integration unit 420 that is configured with instructions executable by a processor to obtain the image data (e.g., light intensity data 408, depth data 404, etc.) and integrate (e.g., fuse) the image data using one or more known techniques. For example, the image integration unit 420 receives depth image data 404 and intensity image data 408 from the image sources (e.g., light intensity camera 406 and depth camera 402), and integrates the image data and generates 3D data 422. The 3D data 422 can include a dense 3D point cloud 424 (e.g., imperfect depth maps and camera poses for a plurality of image frames around the object) that is sent to the semantic 3D unit 440. The different size grey dots in the 3D point cloud 424 represent different depth values detected within the depth data. For example, image integration unit 422 fuses RGB images from a light intensity camera with a sparse depth map from a depth camera (e.g., time-of-flight sensor) and other sources of physical environment information to output a dense depth point cloud of information. The 3D data 422 can also be voxelized, as represented by the voxelized 3D point cloud 426, where the different shading on each voxel represents a different depth value.

The 3D representation unit 410 further includes a semantic unit 430 that is configured with instructions executable by a processor to obtain the light intensity image data (e.g., light intensity data 408) and semantically segment wall structures (wall, doors, windows, etc.) and object type (e.g., table, teapot, chair, vase, etc.) using one or more known techniques. For example, the semantic unit 430 receives intensity image data 408 from the image sources (e.g., light intensity camera 406), and generates semantic segmentation data 432 (e.g., RGB-S data). For example, the semantic segmentation 434 illustrates a semantically labelled image of the physical environment 105 in FIG. 1. In some implementations, semantic unit 430 uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

The 3D representation unit 410 further includes a semantic 3D unit 440 that is configured with instructions executable by a processor to obtain the 3D data 422 (e.g., 3D point cloud data 424) from the integration unit 420 and obtain the semantic segmentation data 432 (e.g., RGB-S data) from the semantic unit 430, and generate a semantic 3D representation 445 using one or more techniques. For example, the semantic representation unit 440 generates a semantically labeled 3D point cloud 447 by acquiring the 3D point cloud data 424 and the semantic segmentation 434 using a semantic 3D algorithm that fuses the 3D data and semantic labels. In some implementations, each semantic label includes a confidence value. For example, a particular point may be labeled as an object (e.g., table), and the data point would include x,y,z coordinates and a confidence value as a decimal value (e.g., 0.9 to represent a 90% confidence the semantic label has classified the particular data point correctly). In some implementations, a 3D reconstructed mesh may be generated as the semantic 3D representation 445.

Figure 5:
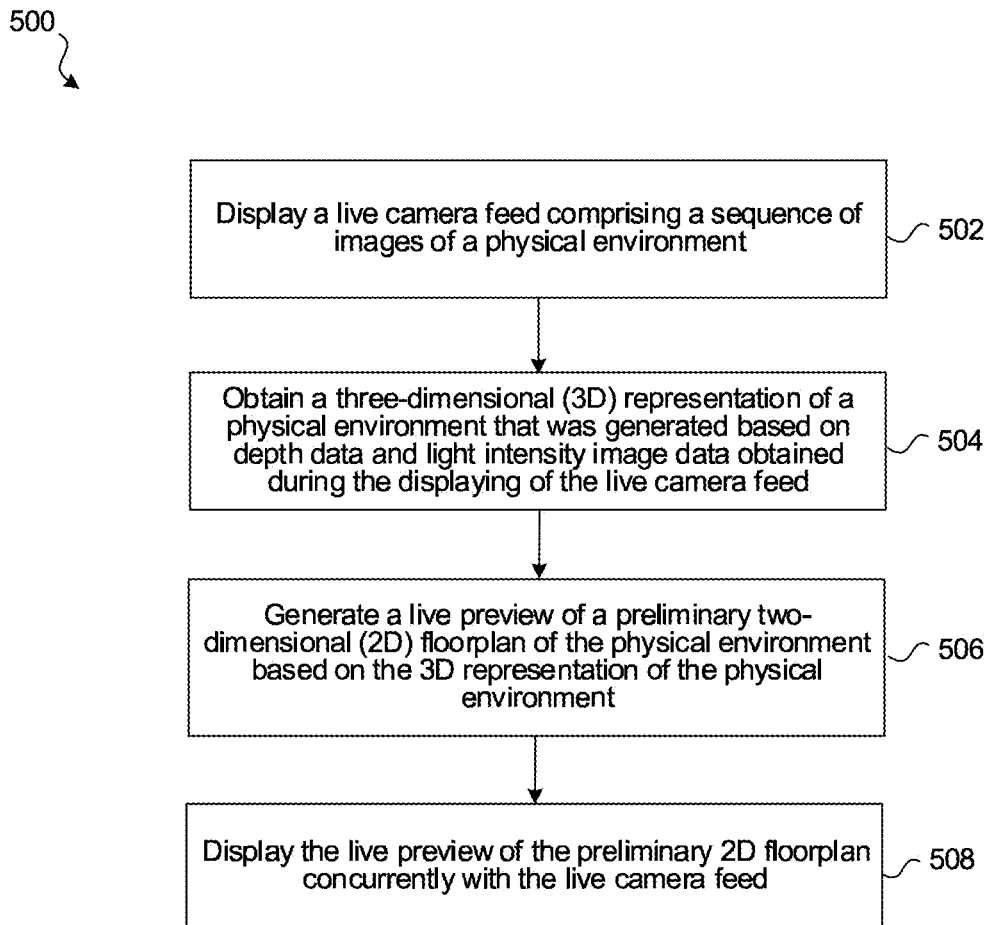
FIG. 5 is a flowchart representation of an exemplary method that generates and displays a live preview of a two-dimensional (2D) floorplan of a physical environment based on a 3D representation of the physical environment in accordance with some implementations.

FIG. 5 is a flowchart representation of an exemplary method 500 that generates and displays a live preview of a preliminary 2D floorplan of a physical environment based on a 3D representation of the physical environment in accordance with some implementations. In some implementations, the method 500 is performed by a device (e.g., server 110 or device 120 of FIGS. 1-3), such as a mobile device, desktop, laptop, or server device. The method 500 can be performed on a device (e.g., device 120 of FIGS. 1 and 3) that has a screen for displaying images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory).

The method 500 is a process that creates a live preview of a preliminary floorplan being displayed during room scanning (e.g., while walking around with a device, such as a smartphone or tablet). To enable a live preview of the preliminary floorplan, the preview may be generated (at least initially) differently than a final post-scan floorplan (e.g., additional post processing techniques for fine-tuning, increased accuracy for measurement data, etc.). For example, a live preview may use a less computationally intensive neural network or provide an initial floorplan without fine-tuning (e.g., corner correction techniques). The use of 2D semantic data (e.g., for different layers of the room) may also facilitate making the preview determination efficient for live display. According to some implementations, the preliminary floorplan creation process includes a 2D top-down view of a room based on separately identifying wall structures (e.g., wall edges, door, and windows) and detecting bounding boxes for objects (e.g., furniture, appliances, etc.). Additionally, or alternatively, a preliminary floorplan creation process for the live preview and/or post processing provides a 2D top-down view of a room based on identifying wall structures (wall edges) based on a 2D representation that encodes 3D semantic data in multiple layers. The live preview of a preliminary floorplan creation process of method 500 is illustrated with reference to FIG. 6.

At block 502, the method 500 displays a live camera feed comprising a sequence of images of a physical environment. For example, the user captures video while walking around the room to capture images of different parts of the room from multiple perspectives, these images are displayed live on a mobile device so that the user sees what he/she is capturing.

At block 504, the method 500 obtains a 3D representation of a physical environment generated based on depth data and light intensity image data obtained during the displaying of the live camera feed. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may capture images of the physical environment 105 for inclusion in the image and depth information about the physical environment 105. In some implementations, a depth sensor on the device 120 (e.g., depth camera 402) determines depth values for voxels that are determined based on images captured by an image sensor on the device 120. The physical environment 105 around the user may be 3D modeled (e.g., 3D point cloud 424) based on one or more values and subsequent depths of objects depicted in subsequent images of the physical environment can be determined based on the model and camera position information (e.g., SLAM information).

At block 506, the method 500 generates a live preview of a preliminary 2D floorplan of the physical environment based on the 3D representation of the physical environment. For example, 2D top-down view of a preliminary floorplan of the physical environment 105 may be generated that includes the structures identified in the room (e.g., walls, table, door, window, etc.). In some implementations, the use of 2D semantic data (e.g., for different layers of the room) may also facilitate making the preview determination efficient for live display. According to some implementations, the preliminary floorplan creation process includes a 2D top-down view of a room based on separately identifying wall structures (e.g., wall edges, door, and windows) and detecting bounding boxes for objects (e.g., furniture, appliances, etc.). Additionally, or alternatively, a preliminary floorplan creation process for the live preview and/or post processing provides a 2D top-down view of a room based on identifying wall structures (wall edges) based on a 2D representation that encodes 3D semantic data in multiple layers.

At block 508, the method 500 displays the live preview of the preliminary 2D floorplan concurrently with the live camera feed. For example, a picture-in-picture display can be shown on the display of the device (e.g., device 120 of FIGS. 1 and 3) while a live camera feed is shown as the main video, and an image a preliminary 2D floorplan is shown as the system is building the floorplan as the user is acquiring more image data sequences (e.g., moving around the room). For example, while a user is seeing a live camera feed of the room environment (e.g., room environment 105), another viewing window with the preliminary 2D floorplan as it is being generated is overlaid on top of the live camera feed (e.g., Picture-In-Picture (PIP)). The overlaid live preview display is illustrated with reference to FIG. 6.

According to some implementations, the method 500 further includes generating a final 2D floorplan of the physical environment based on the 3D representation, wherein generating the final 2D floorplan uses a different process than generating the live preview of the preliminary 2D floorplan. For example, the different process uses a more computationally intensive neural network with fine-tuning (e.g., corner correction), etc. In some implementations, the different process includes classifying corners and small walls based on the 3D representation using a more computationally intensive neural network, generating a transitional 2D floorplan based on the classified corners and small walls, determining refinements for the transitional 2D floorplan using a standardization algorithm, and generating the final 2D floorplan of the physical environment based on the determined refinements for the transitional 2D floorplan.

According to some implementations, the method 500 further includes generating the live preview of the preliminary 2D floorplan by generating an edge map by identifying walls in the physical environment based on the 3D representation, updating the edge map by identifying wall attributes (e.g., doors and windows) in the physical environment based on the 3D representation, updating the edge map by identifying objects in the physical environment based on the 3D representation, and generating the live preview of the preliminary 2D floorplan based on the updated edge map that includes the identified walls, identified wall attributes, and identified objects. In some implementations, generating the live preview of the 2D floorplan includes generating 2D semantic data for multiple horizontal layers of the physical environment based on the 3D representation, and generating the preliminary 2D floorplan using the 2D semantic data. For example, each layer provides x, y semantics for a range of z values, e.g., the first layer may be the most common semantic label for each x, y location for the z value range 0-10.

According to some implementations, the method 500 further includes generating the edge map by identifying walls, where this includes determining parametrically refined lines for the edge map using a line fitting algorithm, and updating the edge map based on the parametrically refined lines. In some implementations, updating the edge map by identifying wall attributes includes determining boundaries for the identified wall attributes using a wall attribute neural network and the sequence of images of the live camera feed (e.g., RGB data for transparent windows), and generating refined boundaries using a polygon heuristics algorithm based on the 3D representation associated with the identified wall attributes. In some implementations, updating the edge map by identifying objects includes generating 3D bounding boxes corresponding to the identified objects in the physical environment based on the 3D representation, and generating 2D representations (e.g., furniture icons or flat 2D bounding boxes) of the 3D bounding boxes.

FIG. 6 is a system flow diagram of an example environment 600 in which a system can generate and display a live preview of a preliminary 2D floorplan of a physical environment based on a 3D representation (e.g., a 3D point cloud, a 3D mesh reconstruction, a semantic 3D point cloud, etc.) of the physical environment. In some implementations, the system flow of the example environment 600 is performed on a device (e.g., server 110 or device 120 of FIGS. 1-3), such as a mobile device, desktop, laptop, or server device. The system flow of the example environment 600 can be displayed on a device (e.g., device 120 of FIGS. 1 and 3) that has a screen for displaying images and/or a screen for viewing stereoscopic images such as a head-mounted display (HMD). In some implementations, the system flow of the example environment 600 is performed on processing logic, including hardware, firmware, software, or a combination thereof. In some implementations, the system flow of the example environment 600 is performed on a processor executing code stored in a non-transitory computer-readable medium (e.g., a memory).

The system flow of the example environment 600 acquires image data (e.g., live camera feed from light intensity camera 406) of a physical environment (e.g., the physical environment 105 of FIG. 1), a semantic 3D representation (e.g., semantic 3D representation 445) from the semantic 3D unit 440, and other sources of physical environment information (e.g., camera positioning information) at the floorplan live preview unit 610 (e.g., live preview unit 244 of FIG. 2, and/or live preview unit 344 of FIG. 3). Some implementations of the present disclosure may include a SLAM system (e.g., SLAM unit 602). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

The floorplan live preview unit 610 includes an edge mapping unit 612, line fitting unit 613, wall attributes unit 614, post/tuning unit 615, object detection unit 616, post/tuning unit 617, and a floorplan preview integration unit 618. The edge mapping unit 612 and line fitting unit 613 are utilized to generate and refine an edge map based on the semantic 3D representation for the identified walls using one or more of the techniques disclosed herein. For example, edge mapping unit 612 obtains 3D data (e.g., semantic 3D representation 445) for the identified semantically labeled walls from the semantic 3D unit 440, and generates an initial 2D edge map of the identified walls, and the line fitting unit 613 generates refined 2D edge map using a line fitting algorithm. The wall attributes unit 614 and post/tuning unit 615 are utilized to generate and refine wall attribute boundaries based on the semantic 3D representation for the identified walls attributes (e.g., doors and windows) using one or more of the techniques disclosed herein. For example, wall attributes unit 614 obtains light intensity image data (e.g., a key frame from the light intensity data 408) for the identified semantically labeled doors and windows, and generates 2D boundaries of the identified doors and windows. The line fitting unit 613 obtains 3D data (e.g., semantic 3D representation 445) for the identified semantically labeled doors and windows from the semantic 3D unit 440 and generates refined boundaries with associated depth data for each identified door and window using one or more post-processing and fine-tuning algorithms. The object detection unit 616 and post/tuning unit 617 are utilized to generate and refine bounding boxes based on the semantic 3D representation for the identified objects using one or more of the techniques disclosed herein. For example, object detection unit 616 obtains 3D data (e.g., semantic 3D representation 445) for the identified semantically labeled objects from the semantic 3D unit 440, and generates initial bounding boxes of the identified objects, and the post/tuning unit 617 generates refined bounding boxes using one or more post-processing and fine-tuning algorithms.

The floorplan preview integration unit 618 iteratively generates and updates a preliminary 2D floorplan preview feed as the floorplan preview integration unit 618 obtains a refined edge map from the line fitting unit 613, refined boundaries from the post/tuning unit 614, and refined bounding boxes from the post/tuning unit 617. For example, as a user scans a room with a device's camera(s), the acquired image data is continuously updating, thus the edge map, wall attribute boundaries, and bounding boxes for objects can be continuously updating with each iteration of updated image data. The floorplan preview unit 610 sends the preliminary 2D floorplan preview feed (e.g., preview 2D floorplan 630) and the live camera feed to the device display 312. The device display 312 can display the live view (e.g., light intensity image data 408) and a picture-in-picture (PIP) display 620 that includes the preview 2D floorplan 630. The preview 2D floorplan 630 includes edge map walls 632a, 632b, 632c (e.g., representing walls 134, 130, 132, respectively), boundary 634a (e.g., representing door 150), boundary 634b (e.g., representing window 152), bounding box 636a (e.g., representing table 142), and bounding box 636b (e.g., representing chair 140). In some implementations, standardized icons are used for identified objects (e.g., a "table" icon is displayed instead of a bounding box or 2D box as shown in FIG. 6 for bounding box 636a if a table is identified in the 3D representation data).

Figure 7:
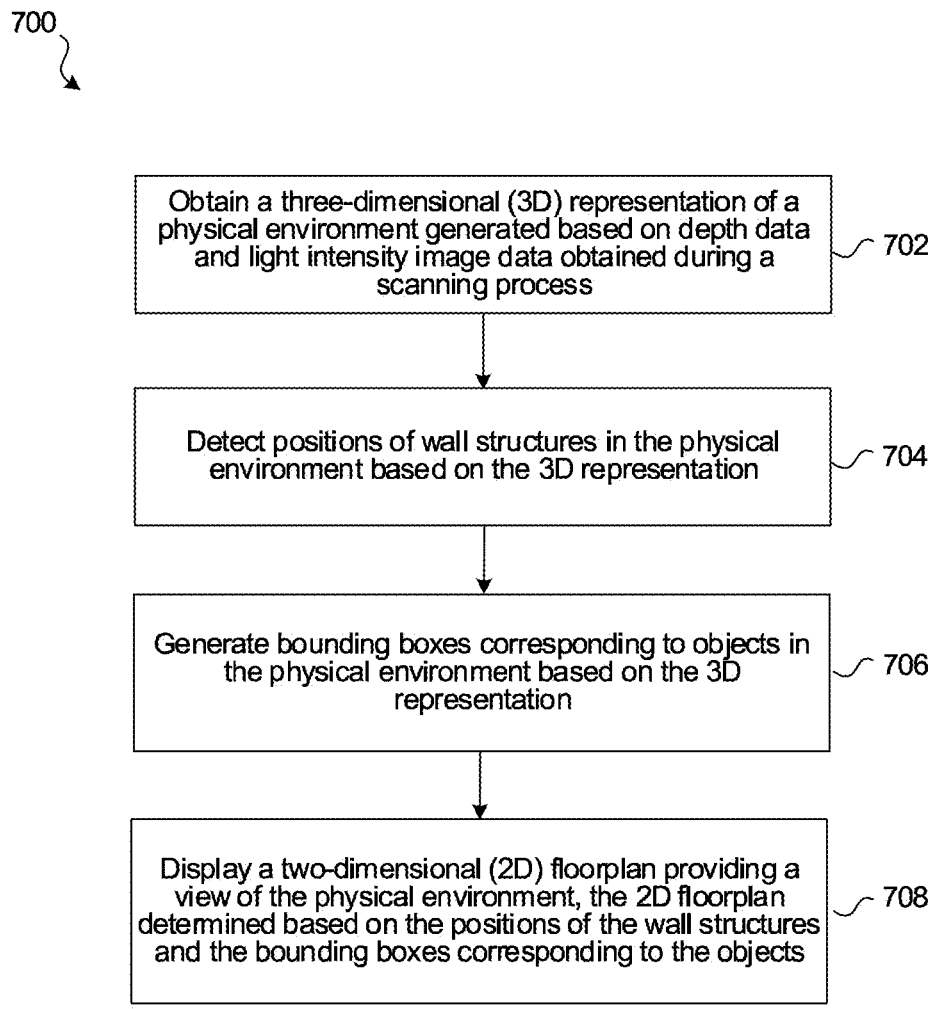
FIG. 7 is a flowchart representation of an exemplary method that generates and displays a 2D floorplan of a physical environment in accordance with some implementations.

FIG. 7 is a flowchart representation of an exemplary method 700 that generates and displays a 2D floorplan of a physical environment in accordance with some implementations. In some implementations, the method 700 is performed by a device (e.g., server 110 or device 120 of FIGS. 1-3), such as a mobile device, desktop, laptop, or server device. The method 700 can be performed on a device (e.g., device 120 of FIGS. 1 and 3) that has a screen for displaying images and/or a screen for viewing stereoscopic images such as a head-mounted display (HMD). In some implementations, the method 500 is performed by processing logic, including hardware, firmware, software, or a combination thereof. In some implementations, the method 700 is performed by a processor executing code stored in a non-transitory computer-readable medium (e.g., a memory).

The method 700 is a process that creates a floorplan of a physical space (e.g., physical environment 105). The method 700 provides a floorplan that includes 2D top-down view of a room(s) based on separately identifying wall structures (wall edges, door, & windows) and generating bounding boxes for detected objects (e.g., furniture, appliances, etc.) that are in the room. Additionally, or alternatively, a floorplan creation process for the provides a 2D top-down view of a room based on identifying wall structures (wall edges) based on a 2D representation that encodes 3D semantic data in multiple layers. The floorplan creation process of method 700 is illustrated with reference to FIGS. 8A-8D.

At block 702, the method 700 obtains a 3D representation of a physical environment generated based on depth data and light intensity image data obtained during a scanning process. For example, a 3D point cloud may be generated based on depth camera information received concurrently with the images during a room scan. In some implementations, the 3D representation is associated with 3D semantic data that includes a 3D point cloud that includes semantic labels associated with at least a portion of 3D points within the 3D point cloud (e.g., semantic 3D point cloud 447). Additionally, in some implementations, the semantic labels identify walls, wall attributes (e.g., doors and windows), objects, and classifications of the objects of the physical environment.

At block 704, the method 700 detects positions of wall structures in the physical environment based on the 3D representation. For example, walls may be identified by generating 2D semantic data (e.g., in layers), using the 2D semantic data to generate an edge map using a neural network, and determining vector parameters to standardize the edge map in a 3D normalized plan. Wall attributes or wall attributes (e.g., doors/windows) may be identified based on RGB images and depth data to generate polygon boundaries. This technique for doors and windows provides advantages, especially due to transparency of windows which creates noise/errors in depth data.

At block 706, the method 700 generates bounding boxes corresponding to objects in the physical environment based on the 3D representation. For example, the 3D bounding boxes may provide location, pose (e.g., location and orientation), and shape of each piece furniture and appliance in the room. Bounding boxes may be refined using RGB data and novel multi-network adjustment techniques (e.g., 2-stage neural network fine-tuning for low precision/high recall and high precision/low recall).

At block 708, the method 700 displays a 2D floorplan providing a view (e.g., top down) of the physical environment. In some implementations, the 2D floorplan is determined based on the positions of the wall structures and the bounding boxes corresponding to the objects. For example, a 2D floorplan is displayed on a device (e.g., device 120 of FIGS. 1 and 3).

According to some implementations, the method 700 further includes detecting positions of wall structures in the physical environment based on the 3D representation includes identifying walls and wall attributes (e.g., doors and windows) of the physical environment from the wall structures based on the 3D representation, and generating an edge map of the identified walls and the wall attributes based on the 3D representation, wherein the 2D floorplan is based on the generated edge map that includes the identified walls and identified wall attributes. In some implementations, the exemplary method further involves classifying corners and small walls using a more computationally intensive neural network, updating the 2D floorplan based on the classified corners and small walls, and determining a refined final 2D floorplan using a standardization algorithm based on the updated 2D floorplan. In some implementations, the exemplary method further involves determining boundaries for the identified wall structures using a wall structure neural network and light intensity image data (e.g., RGB data) obtained during the scanning process, and generating refined boundaries using a polygon heuristics algorithm based on the 3D semantic data associated with the identified wall attributes.

According to some implementations, the bounding boxes are refined bounding boxes, and method 700 further involves generating a refined bounding box for an object by generating a proposed bounding box using a first neural network, and generating the refined bounding box by identifying features of the object using a second neural network (e.g., low precision/high recall to generate features of the object) and refining the proposed bounding box using a third neural network (e.g., high precision/low recall to refine the accuracy of the generated features and output a refined bounding box) based on the identified features. In some implementations, the first neural network generates the proposed bounding box based on the 3D representation associated with the object. In some implementations, the second neural network identifies the features of the object based on the 3D representation associated with the object and light intensity image data (e.g., RGB data) obtained during the scanning process. In some implementations, the third neural network is trained to refine the accuracy of the identified features from the second neural network and output a refined bounding box based on the 3D representation associated with the object and light intensity image data (e.g., RGB data) obtained during the scanning process. In some implementations, the bounding boxes provide location information, pose information (e.g., location and orientation information), and shape information for the objects in the physical environment.

Figure 8A:
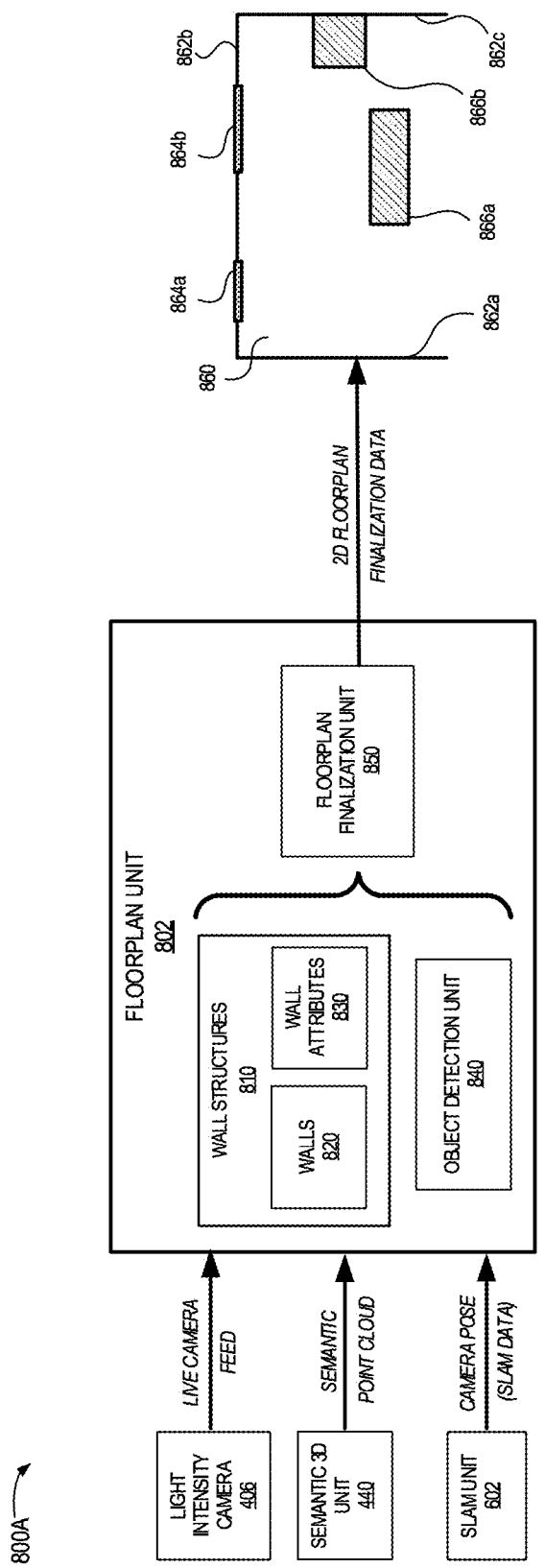
FIGS. 8A-8D are system flow diagrams illustrating an example generation of a 2D floorplan of a physical environment according to some implementations.

FIG. 8A is a system flow diagram of an example environment 800A in which a system can generate and display a 2D floorplan of a physical environment based on a 3D representation (e.g., a 3D point cloud, a 3D mesh reconstruction, a semantic 3D point cloud, etc.) of the physical environment. In some implementations, the system flow of the example environment 800A can be displayed on a device (e.g., device 120 of FIGS. 1 and 3) that has a screen for displaying images and/or a screen for viewing stereoscopic images such as a head-mounted display (HMD). In some implementations, the system flow of the example environment 800A is performed on processing logic, including hardware, firmware, software, or a combination thereof. In some implementations, the system flow of the example environment 800A is performed on a processor executing code stored in a non-transitory computer-readable medium (e.g., a memory).

The system flow of the example environment 800A acquires image data (e.g., live camera feed from light intensity camera 406) of a physical environment (e.g., the physical environment 105 of FIG. 1), a semantic 3D representation (e.g., semantic 3D representation 445) from the semantic 3D unit 440, and other sources of physical environment information (e.g., camera positioning information) at the floorplan finalization unit 850 (e.g., floorplan unit 246 of FIG. 2, and/or live floorplan 346 of FIG. 3). Some implementations of the present disclosure may include a SLAM system (e.g., SLAM unit 602).

The floorplan unit 802 includes a wall structures unit 810, an object detection unit 840 (illustrated in FIG. 8D), and a floorplan finalization unit 850. The wall structures unit 810 unit includes a walls unit 820 (illustrated in FIG. 8B) and a wall attributes unit 830 (illustrated in FIG. 8C). The floorplan finalization unit 850 generates a 2D floorplan finalization data as the floorplan finalization unit 850 obtains a refined edge map from the walls unit 820, refined boundaries from the wall attributes unit 830, and refined bounding boxes from the object detection unit 840. The floorplan finalization unit 850 sends the 2D floorplan (e.g., 2D floorplan 860) to a device display (e.g., display 312 or device 120). The 2D floorplan 860 includes edge map walls 862*a*, 862*b*, 862*c* (e.g., representing walls 134, 130, 132, respectively), boundary 864*a* (e.g., representing door 150), boundary 864*b* (e.g., representing window 152), bounding box 866*a* (e.g., representing table 142), and bounding box 866*b* (e.g., representing chair 140).

In some implementations, the floorplan finalization unit 850 includes a standardization unit that refines the 2D floorplan using a standardization algorithm. For example, architectural floorplans are used in the industry with common features or elements that meet a standard plan that makes it easier and more efficient to read the floorplan. Some standards include the use of generic icons to replace recognized objects, such as furniture, appliances, etc. in lieu of a bounding box. The measurement data would still reflect the refined bounding box x, y, z measurements but an icon representing the object may be used.

In some implementations, the floorplan finalization unit 850 includes a measurement unit to generate measurement data based on the 3D representation for the walls identified on the edge map, measurement data for the identified boundaries of the wall attributes, and measurement data for the bounding boxes of the identified objects using one or more processes further disclosed herein.

Figure 8B:
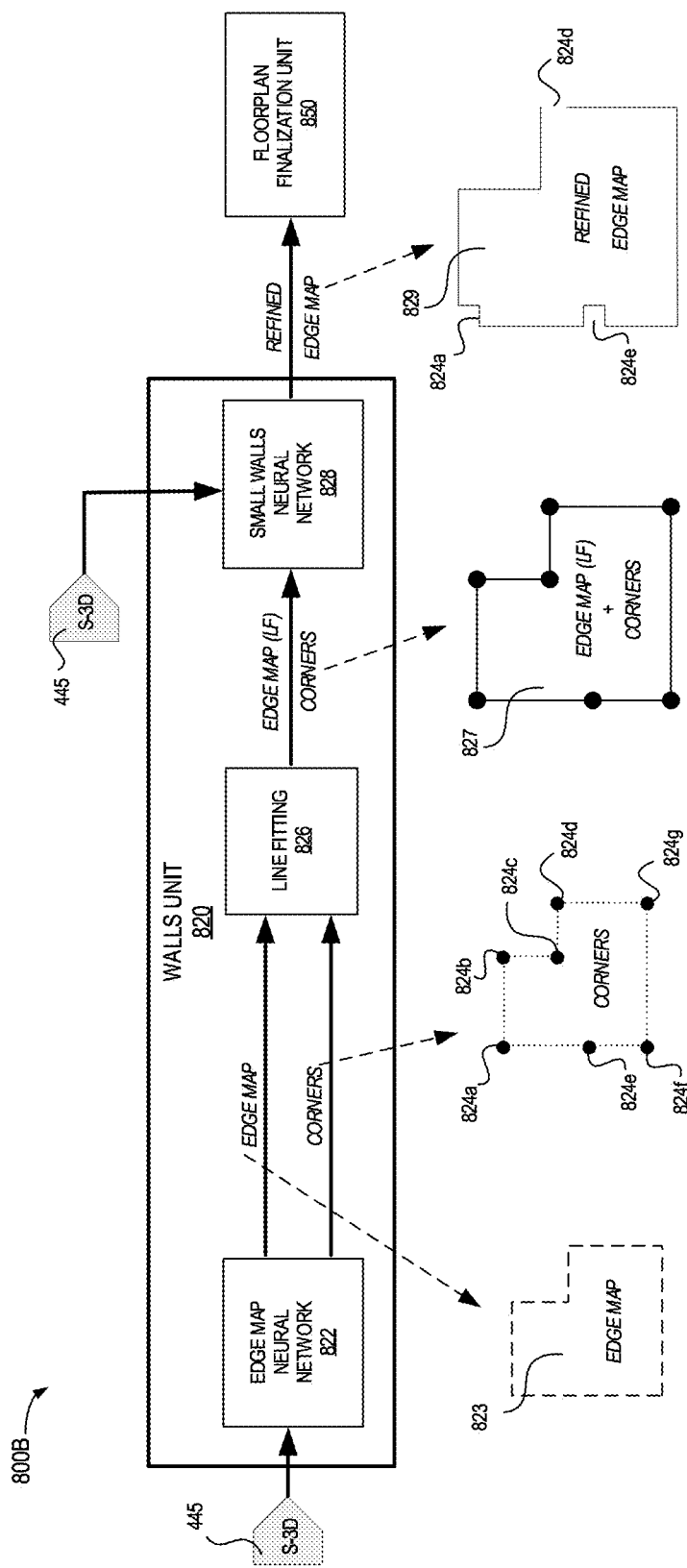

FIG. 8B is a system flow diagram of an example environment 800B in which walls unit 820 can generate a refined edge map based on a 3D representation of the physical environment. In some implementations, the system flow of the example environment 800B is performed on a device (e.g., server 110 or device 120 of FIGS. 1-3), such as a mobile device, desktop, laptop, or server device. In some implementations, the system flow of the example environment 800B is performed on processing logic, including hardware, firmware, software, or a combination thereof. In some implementations, the system flow of the example environment 800B is performed on a processor executing code stored in a non-transitory computer-readable medium (e.g., a memory).

The walls unit 820 includes an edge map neural network 822, line fitting unit 826, and a small walls neural network 828. The system flow of the example environment 800B begins where the edge map neural network 822 acquires a semantic 3D representation (e.g., semantic 3D representation 445), which includes 3D data of identified walls. The edge map neural network 822 generates an initial edge map 823 of the identified walls, and classifies corners 824*a*-824*g* (herein referred to as corners 824). The edge map 823 is then refined by the line fitting unit 826 using a line fitting algorithm to generate a line fitted edge map 827. The line fitted edge map 827 is then further refined by the small walls neural network 828 which further classifies and distinguishes each corner to generate a refined edge map 829. For example, corner 824*a* and 824*e* was initially identified as a standard corner by the acquired data, but the small walls neural network 828 is trained to identify corners that may actually be a pillar or an indented corner such that a finalized floorplan should reflect for accuracy and completeness. Additionally, corner 824*d* may actually be an open pass-through to an adjacent room, and not a wall as initially indicated by the edge map. The refined edge map 829 is then sent to the floorplan finalization unit 850.

Figure 8C:
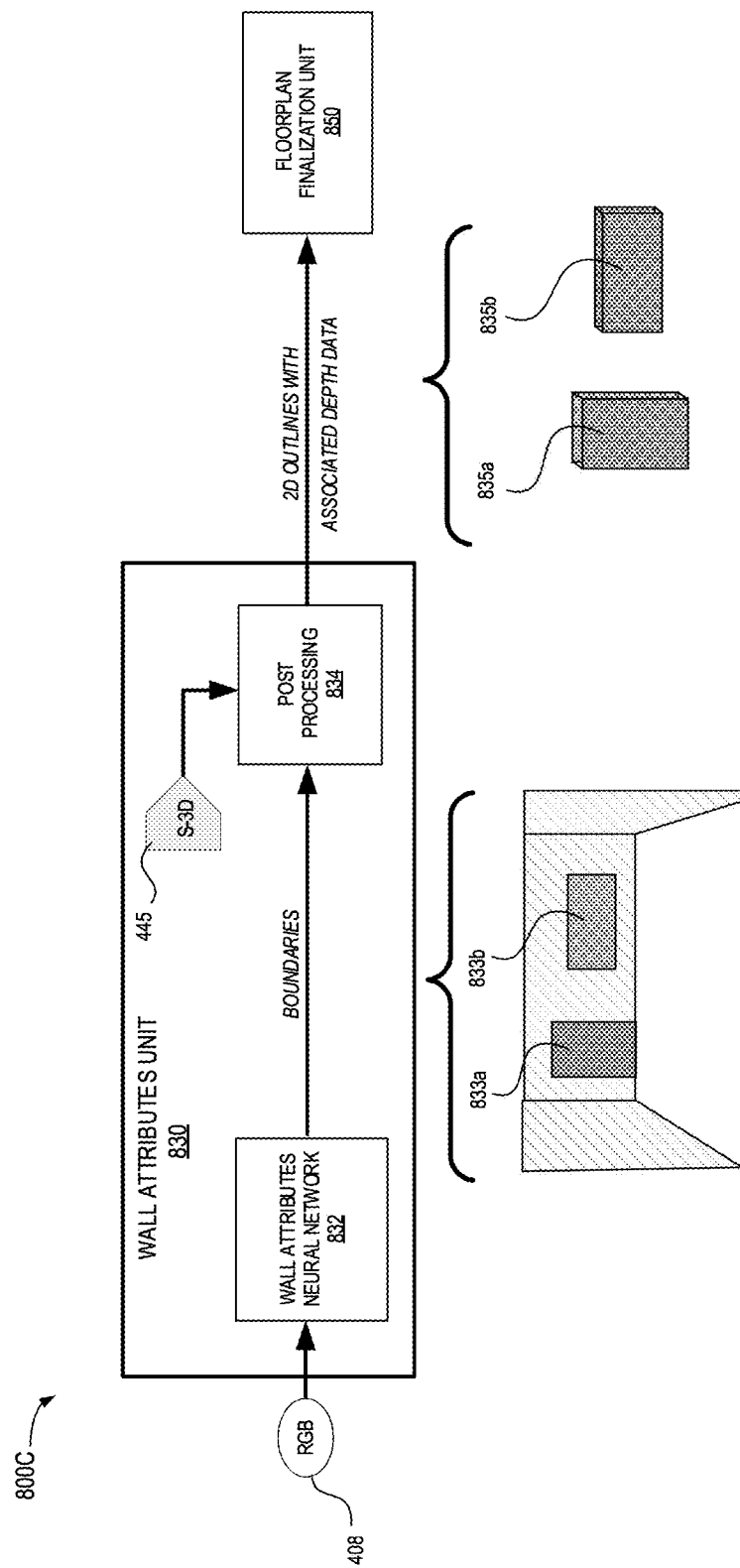

FIG. 8C is a system flow diagram of an example environment 800C in which wall attributes unit 830 can generate refined 2D boundaries with associated depth data based on light intensity images (e.g., a key RGB frame(s)) and a 3D representation of the physical environment. In some implementations, the system flow of the example environment 800C is performed on a device (e.g., server 110 or device 120 of FIGS. 1-3), such as a mobile device, desktop, laptop, or server device. In some implementations, the system flow of the example environment 800C is performed on processing logic, including hardware, firmware, software, or a combination thereof. In some implementations, the system flow of the example environment 800C is performed on a processor executing code stored in a non-transitory computer-readable medium (e.g., a memory).

The wall attributes unit 830 includes a wall attributes neural network 832 and a post processing unit 834. The system flow of the example environment 800C begins where the wall attributes unit 830 acquires light intensity images (e.g., light intensity image data 408) at the wall attributes neural network 832 which generates initial boundary 833*a* and boundary 833*b* of the identified wall attributes (e.g., boundaries representing door 150 and window 152, respectively). The boundaries 833*a*, 833*b* are then refined by the post processing unit 834 which obtains a semantic 3D representation (e.g., semantic 3D representation 445), which includes 3D data of identified wall attributes, and using a polygon heuristics algorithm and generates refined 2D boundaries 835*a*, 835*b* with associated depth data. The refined 2D boundaries 835*a*, 835*b* are then sent to the floorplan finalization unit 850.

Figure 8D:
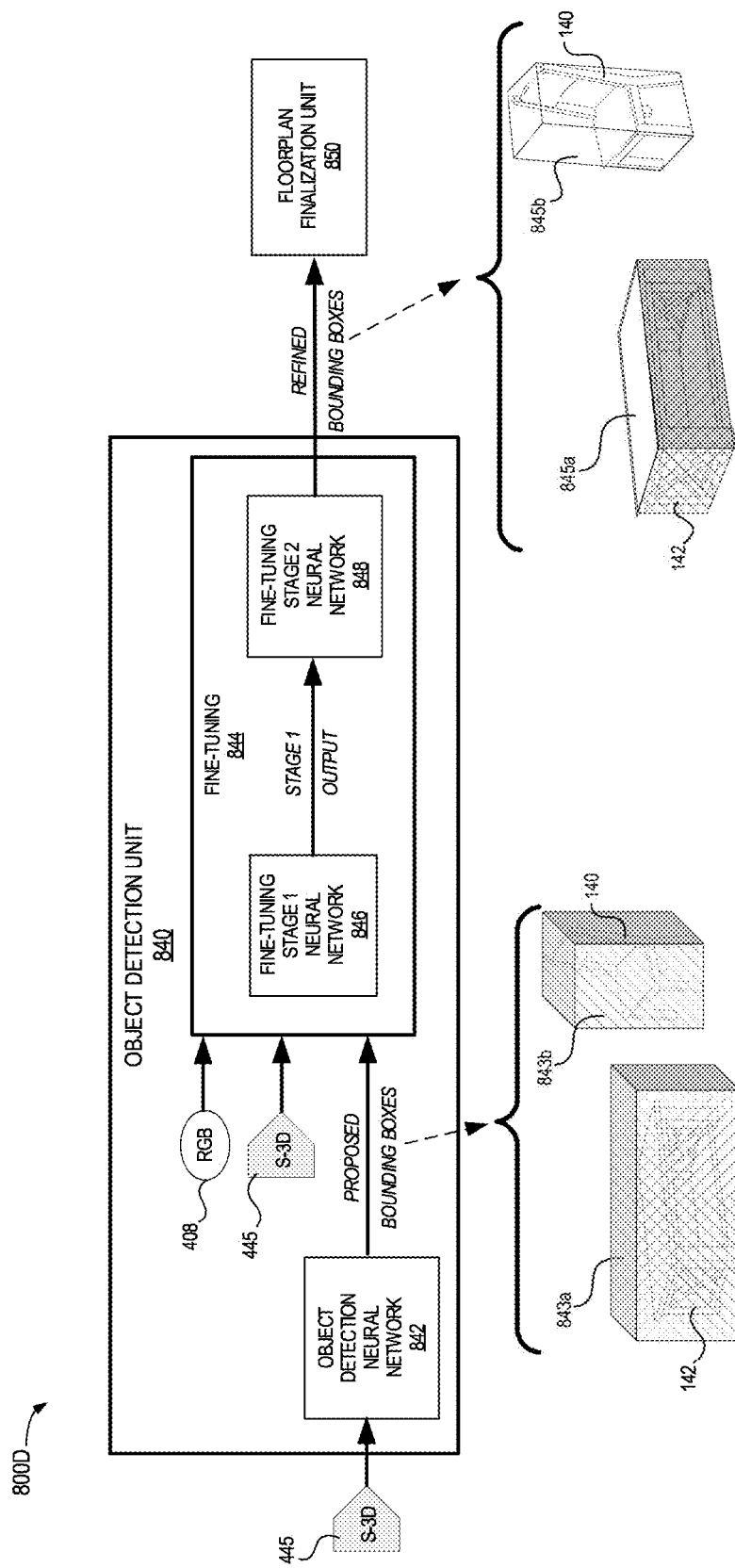

FIG. 8D is a system flow diagram of an example environment 800D in which an object detection unit 840 can generate refined bounding boxes for associated identified objects based on a 3D representation of the physical environment. In some implementations, the system flow of the example environment 800D is performed on a device (e.g., server 110 or device 120 of FIGS. 1-3), such as a mobile device, desktop, laptop, or server device. In some implementations, the system flow of the example environment 800D is performed on processing logic, including hardware, firmware, software, or a combination thereof. In some implementations, the system flow of the example environment 800D is performed on a processor executing code stored in a non-transitory computer-readable medium (e.g., a memory).

The object detection unit 840 includes an object detection neural network 842 and a fine-tuning unit 844 that includes a fine-tuning stage 1 neural network 846 and a fine-tuning stage 2 neural network 848. The system flow of the example environment 800D begins where the object detection unit 840 acquires a semantic 3D representation (e.g., semantic 3D representation 445), which includes 3D data of identified objects, at the object detection neural network 842 which generates proposed bounding boxes 843*a* and 843*b* of the identified objects (e.g., table 142 and chair 140, respectively). The proposed bounding boxes 843*a* and 843*b* are then refined by the fine-tuning unit 844 using a two stage neural network. The fine-tuning stage 1 neural network 846 acquires the semantic 3D representation data, light intensity image data (e.g., light intensity image data 408), and the proposed bounding boxes 843*a* and 843*b* and generates a stage 1 output. The fine-tuning stage 1 neural network 846 uses a neural network to identify features of the object using low precision/high recall network to generate features of the object. The 3D data, light intensity image data, proposed bounding boxes 843*a*, 843*b*, and the stage 1 output are obtained by the fine-tuning stage 2 neural network 848 that generates refined bounding boxes using high precision/low recall neural network to refine the accuracy of the generated features and output refined bounding boxes 845*a* and 845*b* (e.g., table 142 and chair 140, respectively). As illustrated in FIG. 8D, the refined bounding boxes 845*a* and 845*b* are more accurate than the bounding boxes 843*a* and 843*b*, respectively. The refined bounding boxes 845*a* and 845*b* are then sent to the floorplan finalization unit 850.

Figure 9:
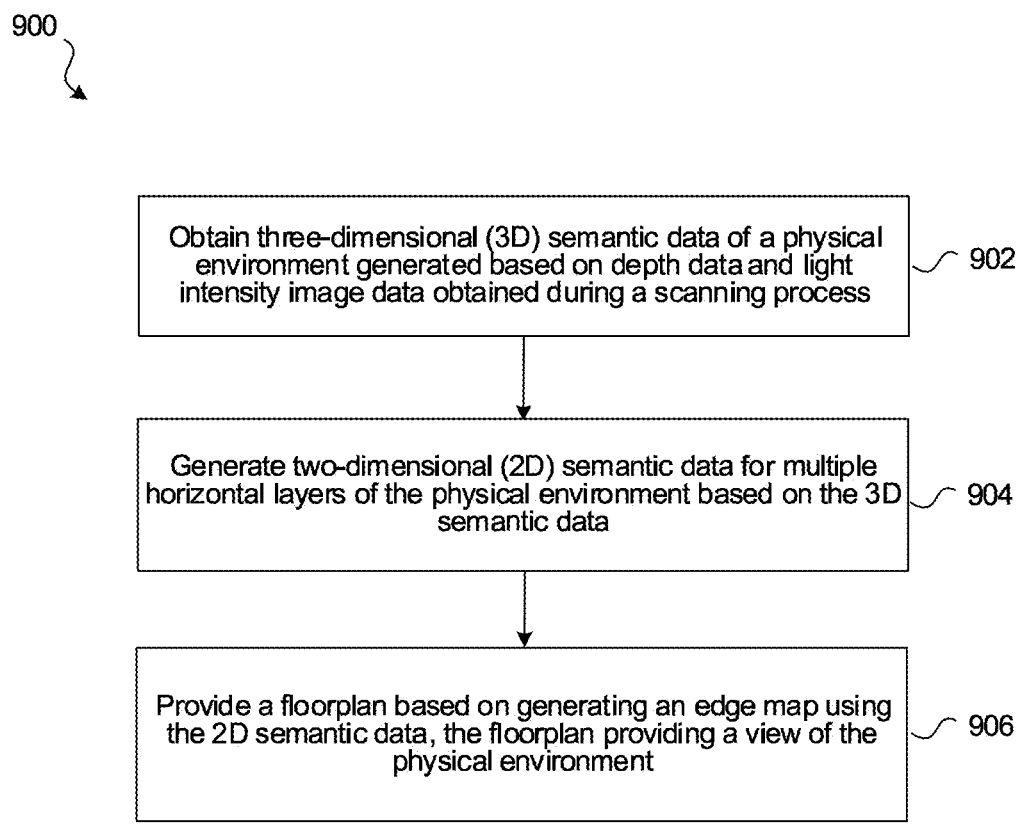
FIG. 9 is a flowchart representation of an exemplary method that generates and provides a floorplan of a physical environment based on generating an edge map using 2D semantic data according to some implementations.

FIG. 9 is a flowchart representation of an exemplary method 900 that generates and provides a floorplan of a physical environment based on generating an edge map using 2D semantic data in accordance with some implementations. In some implementations, the method 900 is performed by a device (e.g., server 110 or device 120 of FIGS. 1-3), such as a mobile device, desktop, laptop, or server device. The method 900 can be performed on a device (e.g., device 120 of FIGS. 1 and 3) that has a screen for displaying images and/or a screen for viewing stereoscopic images such as a head-mounted display (HMD). In some implementations, the method 900 is performed by processing logic, including hardware, firmware, software, or a combination thereof. In some implementations, the method 900 is performed by a processor executing code stored in a non-transitory computer-readable medium (e.g., a memory).

The method 900 is a process that creates a floorplan of a physical space (e.g., physical environment 105) based on 2D semantic data. The method 900 provides a floorplan that includes 2D top-down view of a room(s) based on generating 2D semantic data for multiple horizontal layers based on the received semantic 3D semantic data. The floorplan creation process of method 900 is illustrated with reference to FIG. 10.

At block 902, the method 900 obtains 3D semantic data of a physical environment generated based on depth data and light intensity image data obtained during a scanning process. For example, a 3D point cloud may be generated based on depth camera information received concurrently with the images during a room scan. In some implementations, the 3D semantic data includes a 3D point cloud that includes semantic labels associated with at least a portion of 3D points within a 3D point cloud representation of the physical environment (e.g., semantic 3D point cloud 447). Additionally, in some implementations, the semantic labels identify walls, wall attributes (e.g., doors and windows), objects, and classifications of the objects of the physical environment.

At block 904, the method 900 generates 2D semantic data for multiple horizontal layers of the physical environment based on the 3D semantic data. For example, each layer provides x, y semantics for a range of z values, e.g., the first layer may be the most common semantic label for each x, y location for the z value range 0-10.

At block 906, the method 900 provides a floorplan based on generating an edge map using the 2D semantic data, where the floorplan provides a view (e.g., top down) of the physical environment. In some implementations, generating the edge map may involve determining a parametric representation and/or vector parameters to standardize the edge map in a 3D normalized plan.

According to some implementations, the method 900 further includes generating the edge map by identifying walls in the physical environment based on the 2D semantic data for multiple horizontal layers, updating the edge map by identifying wall attributes (e.g., doors and windows) in the physical environment based on the 3D semantic data, updating the edge map by identifying objects in the physical environment based on the 3D semantic data, and generating the floorplan based on the updated edge map that includes the identified walls, identified wall attributes, and identified objects.

According to some implementations, for method 900, the identified walls are floor-to-ceiling walls (e.g., not cubicle walls), wherein identifying floor-to-ceiling walls based on the 2D semantic data for multiple horizontal layers includes identifying a floor of the physical environment having a lowest level of the multiple horizontal layers, identifying a ceiling of the physical environment having a highest level of the multiple horizontal layers, determining that a particular identified wall is a not a floor-to-ceiling wall (e.g., cubicle wall) based on a height of the particular identified wall does not meet a height threshold compared to a height of the ceiling, and updating the edge map by removing the particular identified wall from the edge map.

In some implementations, the method 900 further includes generating the edge map by identifying walls further includes determining parametrically refined lines for the edge map using a line fitting algorithm, and updating the edge map based on the parametrically refined lines. In some implementations, updating the edge map by identifying wall attributes includes determining boundaries for the identified wall attributes using a wall attribute neural network and a light intensity image obtained during the scanning process (e.g., RGB data for transparent windows), and generating refined boundaries using a polygon heuristics algorithm based on the 3D semantic data associated with the identified wall attributes.

In some implementations, the method 900 further includes updating the edge map by identifying objects includes generating 3D bounding boxes corresponding to the identified objects in the physical environment based on the 3D semantic data, and generating 2D representations (e.g., furniture icons or flat 2D bounding boxes) of the 3D bounding boxes. In some implementations, the bounding boxes are refined bounding boxes, and generating a refined bounding box for an object includes generating a proposed bounding box using a first neural network, and generating the refined bounding box by identifying features of the object using a second neural network (e.g., low precision/high recall to generate features of the object) and refining the proposed bounding box using a third neural network (e.g., high precision/low recall to refine the accuracy of the generated features and output a refined bounding box) based on the identified features.

Figure 10:
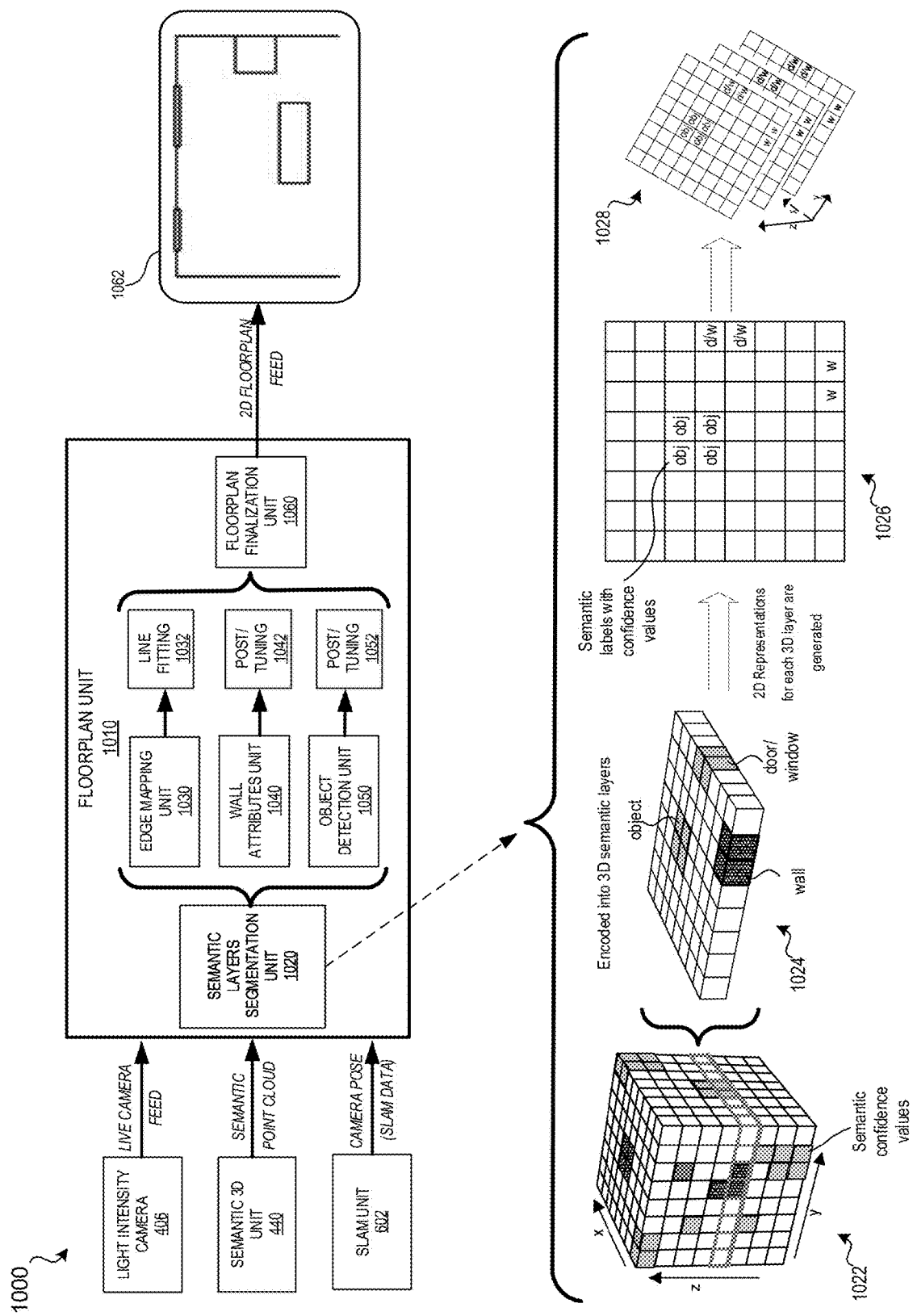
FIG. 10 is a system flow diagram of an example generation of a floorplan of a physical environment based on generating an edge map using 2D semantic data according to some implementations.

FIG. 10 is a system flow diagram of an example environment 1000 in which a system can generate and provide for display a 2D floorplan of a physical environment based on a 3D representation (e.g., a 3D point cloud, a 3D mesh reconstruction, a semantic 3D point cloud, etc.) of the physical environment. In some implementations, the system flow of the example environment 1000 is performed on a device (e.g., server 110 or device 120 of FIGS. 1-3), such as a mobile device, desktop, laptop, or server device. The system flow of the example environment 1000 can be displayed on a device (e.g., device 120 of FIGS. 1 and 3) that has a screen for displaying images and/or a screen for viewing stereoscopic images such as a head-mounted display (HMD). In some implementations, the system flow of the example environment 1000 is performed on processing logic, including hardware, firmware, software, or a combination thereof. In some implementations, the system flow of the example environment 1000 is performed on a processor executing code stored in a non-transitory computer-readable medium (e.g., a memory).

The system flow of the example environment 1000 acquires image data (e.g., live camera feed from light intensity camera 406) of a physical environment (e.g., the physical environment 105 of FIG. 1), a semantic 3D representation (e.g., semantic 3D representation 445) from the semantic 3D unit 440, and other sources of physical environment information (e.g., camera positioning information) at the floorplan unit 1010.

The floorplan unit 1010 includes a semantic layers segmentation unit 1020, an edge mapping unit 1030, line fitting unit 1032, wall attributes unit 1040, post/tuning unit 1042, object detection unit 1050, post/tuning unit 1052, and a floorplan finalization unit 1060. The semantic layers segmentation unit 1020 obtains the image data and semantic 3D representation (e.g., voxelized 3D point cloud 1022) and encodes the semantic confidence values and localization data (e.g., global coordinates) of the 3D point cloud into 3D semantic layers (e.g., 3D semantic layer 1024). The semantic layers segmentation unit 1020 then generates 2D representations (e.g., 2D semantic layer 1026) for each 3D semantic layer. The semantic layers segmentation unit 1020 then generates a height map of the 2D semantic layers. For example, the 2D semantic height map 1028 can be used to determine whether a semantically identified wall is a floor-to-ceiling wall that should be included in the floorplan, or if the semantically identified wall does not reach the height of the ceiling (e.g., a cubicle wall) based on an identified height threshold in comparison to the identified height of the ceiling, then the system (e.g., floorplan unit 1010) can determine to not include that particular wall in the edge map and associated floorplan. For example, if the wall height threshold is set at 90% of the ceiling height (e.g., for a 10 foot ceiling there would be a 9 foot height threshold), and an identified wall is determined to be 6 feet in height based on the 2D semantic layers, than the identified wall would be labeled by the floorplan unit 1010 as a cubicle wall and would not be associated with the edge map. In some implementations, a wall that does not meet the height of the ceiling (e.g, a cubicle wall) may be designated as a classified object, and associated bounding boxes may be generated using techniques described herein for object detection (e.g., object detection unit 1050).

The edge mapping unit 1030 and line fitting unit 1032 are utilized to generate and refine an edge map based on the layered 2D semantic layers 1028 using one or more of the techniques disclosed herein. For example, edge mapping unit 612 obtains encoded 3D data (e.g., 2D semantic layers 1028) for the identified semantically labeled walls from the semantic 3D unit 440, and generates an initial 2D edge map of the identified walls, and the line fitting unit 1032 generates a refined 2D edge map using a line fitting algorithm. The wall attributes unit 1040 and post/tuning unit 1042 are utilized to generate and refine wall attribute boundaries based on the 2D semantic layers 1028 for the identified walls attributes (e.g., doors and windows) using one or more of the techniques disclosed herein. For example, wall attributes unit 1040 obtains light intensity image data (e.g., a key frame from the light intensity data 408) for the identified semantically labeled doors and windows, and generates 2D boundaries of the identified doors and windows. The post/tuning unit 1042 obtains 3D data (e.g., semantic 3D representation 445, 2D semantic layers 1028, etc.) for the identified semantically labeled doors and windows from the semantic 3D unit 440 and generates refined boundaries with associated depth data for each identified door and window using one or more post-processing and fine-tuning algorithms. The object detection unit 1050 and post/tuning unit 1052 are utilized to generate and refine bounding boxes based on the 2D semantic layers 1028 for the identified objects using one or more of the techniques disclosed herein. For example, object detection unit 1050 obtains 3D data (e.g., semantic 3D representation 445, 2D semantic layers 1028, or the like) for the identified semantically labeled objects from the semantic 3D unit 440, and generates initial bounding boxes of the identified objects, and the post/tuning unit 1052 generates refined bounding boxes using one or more post-processing and fine-tuning algorithms.

The floorplan finalization unit 1060 generates a 2D floorplan finalization data as the floorplan finalization unit 1060 obtains a refined edge map from the edge mapping unit 1030 and post/tuning unit 1032, refined boundaries from the wall attributes unit 1040 and post/tuning unit 1042, and refined bounding boxes from the object detection unit 1050 and post/tuning unit 1052. The floorplan finalization unit 1060 sends the 2D floorplan (e.g., 2D floorplan 1062) to a device display (e.g., display 312 or device 120). The 2D floorplan 1062 includes edge map walls (e.g., representing walls 134, 130, 132 of FIG. 1), wall attribute boundaries (e.g., representing door 150 and window 152 of FIG. 1), and bounding boxes (e.g., representing table 142 and chair 140 of FIG. 1).

In some implementations, the floorplan finalization unit 1060 includes a standardization unit that refines the 2D floorplan using a standardization algorithm. For example, architectural floor plans are used in the industry with common features or elements that meet a standard plan that makes it easier and more efficient to read the floorplan. Some standards include the use of generic icons to replace recognized objects, such as furniture, appliances, etc. in lieu of a bounding box. The measurement data would still reflect the refined bounding box x, y, z measurements but an icon representing the object may be used.

In some implementations, the floorplan finalization unit 1060 includes a measurement unit to generate measurement data based on the 3D representation for the walls identified on the edge map, measurement data for the identified boundaries of the wall attributes, and measurement data for the bounding boxes of the identified objects using one or more processes further disclosed herein.

Figure 11:
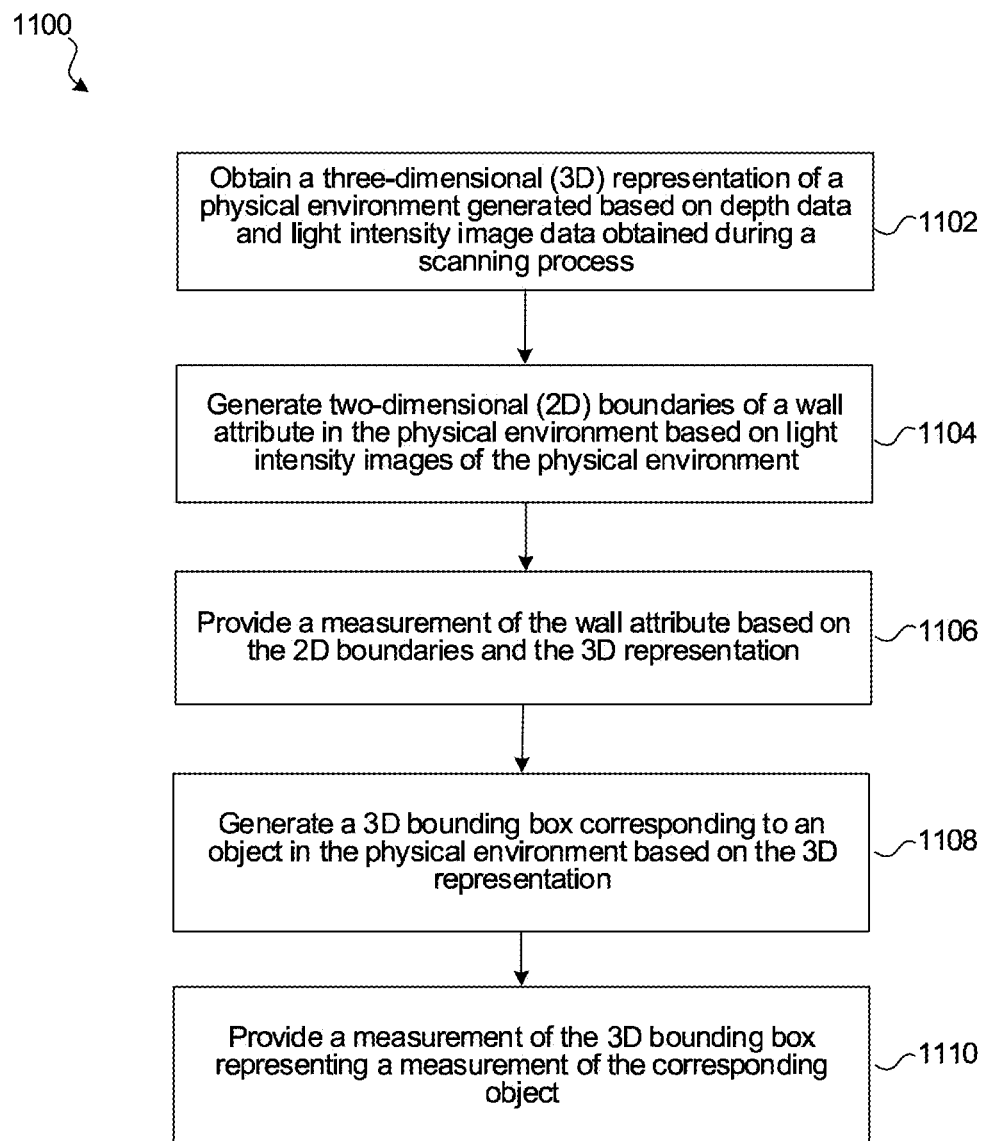
FIG. 11 is a flowchart representation of an exemplary method that generates and provides measurements of wall structures based on 2D boundaries and a 3D representation and measurements of 3D bounding boxes representing measurements of corresponding objects in accordance with some implementations.

FIG. 11 is a flowchart representation of an exemplary method 1100 that generates and provides measurements of wall structures and 3D bounding boxes associated with objects in a physical environment in accordance with some implementations. In some implementations, the method 1100 is performed by a device (e.g., server 110 or device 120 of FIGS. 1-3), such as a mobile device, desktop, laptop, or server device. The method 1100 can be performed on a device (e.g., device 120 of FIGS. 1 and 3) that has a screen for displaying images and/or a screen for viewing stereoscopic images such as a head-mounted display (HMD). In some implementations, the method 1100 is performed by processing logic, including hardware, firmware, software, or a combination thereof. In some implementations, the method 1100 is performed by a processor executing code stored in a non-transitory computer-readable medium (e.g., a memory).

The method 1100 is a process that creates measurement data for wall attributes (e.g., doors & windows) and objects of a physical space (e.g., physical environment 105). The method 1100 generates boundaries for identified wall structures (e.g., wall edges, doors, & windows) and generates bounding boxes for detected objects (e.g., furniture, appliances, etc.) that are in the room, and then provides measurement data based on the generated boundaries and bounding boxes. The measurement data creation process of method 1100 is illustrated with reference to FIG. 12.

At block 1102, the method 1100 obtains a 3D representation of a physical environment that was generated based on depth data obtained during a scanning process. For example, a 3D point cloud may be generated based on depth camera information received concurrently with the images. In some implementations, the 3D representation is associated with 3D semantic data. In some implementations, the 3D representation is associated with 3D semantic data that includes a 3D point cloud that includes semantic labels associated with at least a portion of 3D points within the 3D point cloud (e.g., semantic 3D point cloud 447). Additionally, in some implementations, the semantic labels identify walls, wall attributes (e.g., doors and windows), objects, and classifications of the objects of the physical environment. For example, algorithms may be used for semantic segmentation and labeling of 3D point clouds of indoor scenes, where objects in point clouds can have significant variations and complex configurations.

At block 1104, the method 1100 generates 2D boundaries of a wall attribute in the physical environment based on light intensity images of the physical environment. For example, all identified wall attributes, such as doors and windows, are analyzed with respect to identified wall edges (e.g., the floor), to generate a 2D boundary for each identified door and widow based on light intensity images (e.g., RGB). In an exemplary implementation, light intensity images are utilized instead of depth data or the 3D representation (e.g., 3D point cloud 447) that was generated based on depth data because of the transparency of windows that may provide inaccurate depth data.

At block 1106, the method 1100 provides a measurement of the wall attribute based on the 2D boundaries and the 3D representation. After the boundaries are created at block 1104 utilizing only light intensity images, the system then generates measurement data using the 2D boundaries and the 3D representation (e.g., 3D point cloud 447). For example, the 3D representation is used to determine how deep and/or wide a wall attribute such as a door or window is given a 2D polygonal shape associated with the wall attribute.

At block 1108, the method 1100 generates a 3D bounding box corresponding to an object in the physical environment based on the 3D representation. For example, the 3D bounding boxes may provide location, pose (e.g., location and orientation), and shape of each piece furniture and appliance in the room. Bounding boxes may be refined using RGB data and novel multi-network adjustment techniques.

At block 1110, the method 1100 provides a measurement of the 3D bounding box representing a measurement of the corresponding object. For example, length, width, height of the bounding box corresponding to length, width, and height of an object.

According to some implementations, the bounding box is a refined bounding box, and the method 1100 further includes generating a refined bounding box for an object by generating a proposed bounding box using a first neural network, and generating the refined bounding box by identifying features of the object using a second neural network (e.g., low precision/high recall to generate features of the object) and refining the proposed bounding box using a third neural network (e.g., high precision/low recall to refine the accuracy of the generated features and output a refined bounding box) based on the identified features. In some implementations, the first neural network generates the proposed bounding box based on the 3D representation associated with the object. In some implementations, the second neural network identifies the features of the object based on the 3D representation associated with the object and light intensity image data (e.g., RGB data) obtained during the scanning process. In some implementations, the third neural network is trained to refine the accuracy of the identified features from the second neural network and output a refined bounding box based on the 3D representation associated with the object and light intensity image data (e.g., RGB data) obtained during the scanning process. In some implementations, the bounding boxes provide location information, pose information (e.g., location and orientation information), and shape information for the objects in the physical environment.

According to some implementations, the method 1100 further includes generating refined boundaries of the wall attributes using a polygon heuristics algorithm based on the 3D semantic data associated with the wall attributes. In some implementations, the wall attributes include a door or a window.

According to some implementations, the measurements of a boundary associated with a measurement of a particular wall attribute include a length, a width, and a height that correspond to a length, a width, and a height of the particular wall attribute. For example, the length, width, and height of a door. In some implementations, measurements of a 3D bounding box for a particular object include a length, a width, and a height that correspond to a length, a width, and a height of the particular object. For example, the length, width, and height of a bounding box generated for a table or a chair in the room.

Figure 12A:
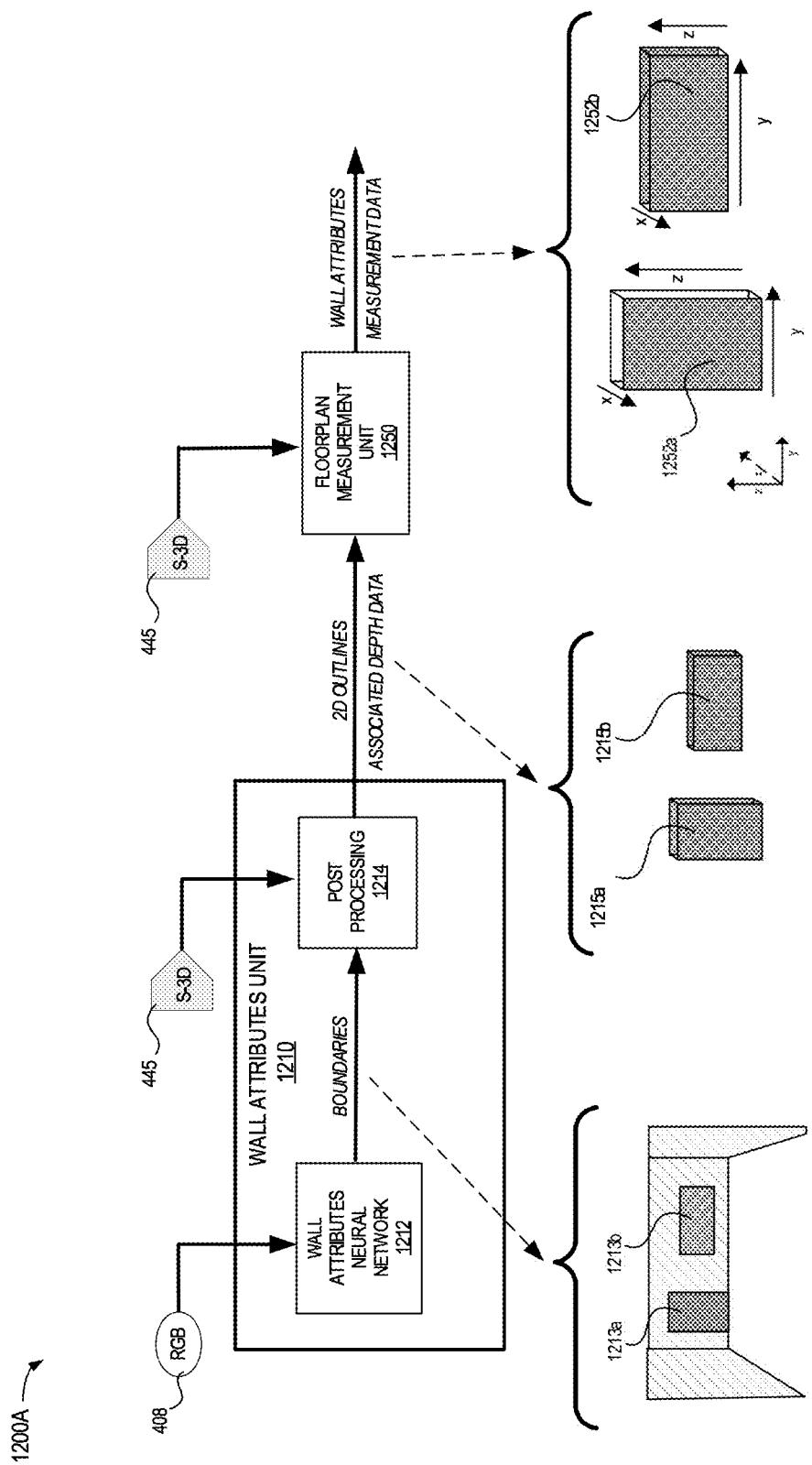
FIG. 12A is a system flow diagram of an example generation of measurements of wall structures based on 2D boundaries and a 3D representation according to some implementations.

FIG. 12A is a system flow diagram of an example environment 1200A in which wall attributes unit 1210 can generate refined 2D boundaries for wall attributes of a physical environment, and a floorplan measurement unit 1250 can provide measurements of said 2D boundaries. In some implementations, the system flow of the example environment 1200A is performed on a device (e.g., server 110 or device 120 of FIGS. 1-3), such as a mobile device, desktop, laptop, or server device. In some implementations, the system flow of the example environment 1200A is performed on processing logic, including hardware, firmware, software, or a combination thereof. In some implementations, the system flow of the example environment 1200A is performed on a processor executing code stored in a non-transitory computer-readable medium (e.g., a memory).

The wall attributes unit 1210 includes a wall attributes neural network 1212 and a post processing unit 1214. The system flow of the example environment 1200A begins where the wall attributes unit 1210 acquires light intensity images (e.g., light intensity image data 408) at the wall attributes neural network 1212 which generates initial boundary 1213a and boundary 1213b of the identified wall attributes (e.g., boundaries representing door 150 and window 152, respectively). The boundaries 1213a, 1213b are then refined by the post processing unit 1214 which obtains a semantic 3D representation (e.g., semantic 3D representation 445), which includes 3D data of identified wall attributes, and using a polygon heuristics algorithm, generates refined 2D boundaries 1215a, 1215b with associated depth data. The refined 2D boundaries 1215a, 1215b are then sent to the floorplan measurement unit 1250 (e.g., measurement unit 248 of FIG. 2, and/or measurement unit 348 of FIG. 3). The floorplan measurement unit 1250 obtains the semantic 3D representation (e.g., semantic 3D representation 445) for the associated boundaries and determines measurements of the boundaries (e.g., boundaries 1252a and 1252b) associated with a particular wall attribute include a length, a width, and a height that correspond to a length, a width, and a height of the particular wall attribute. For example, the length, width, and height of a door or window.

Figure 12B:
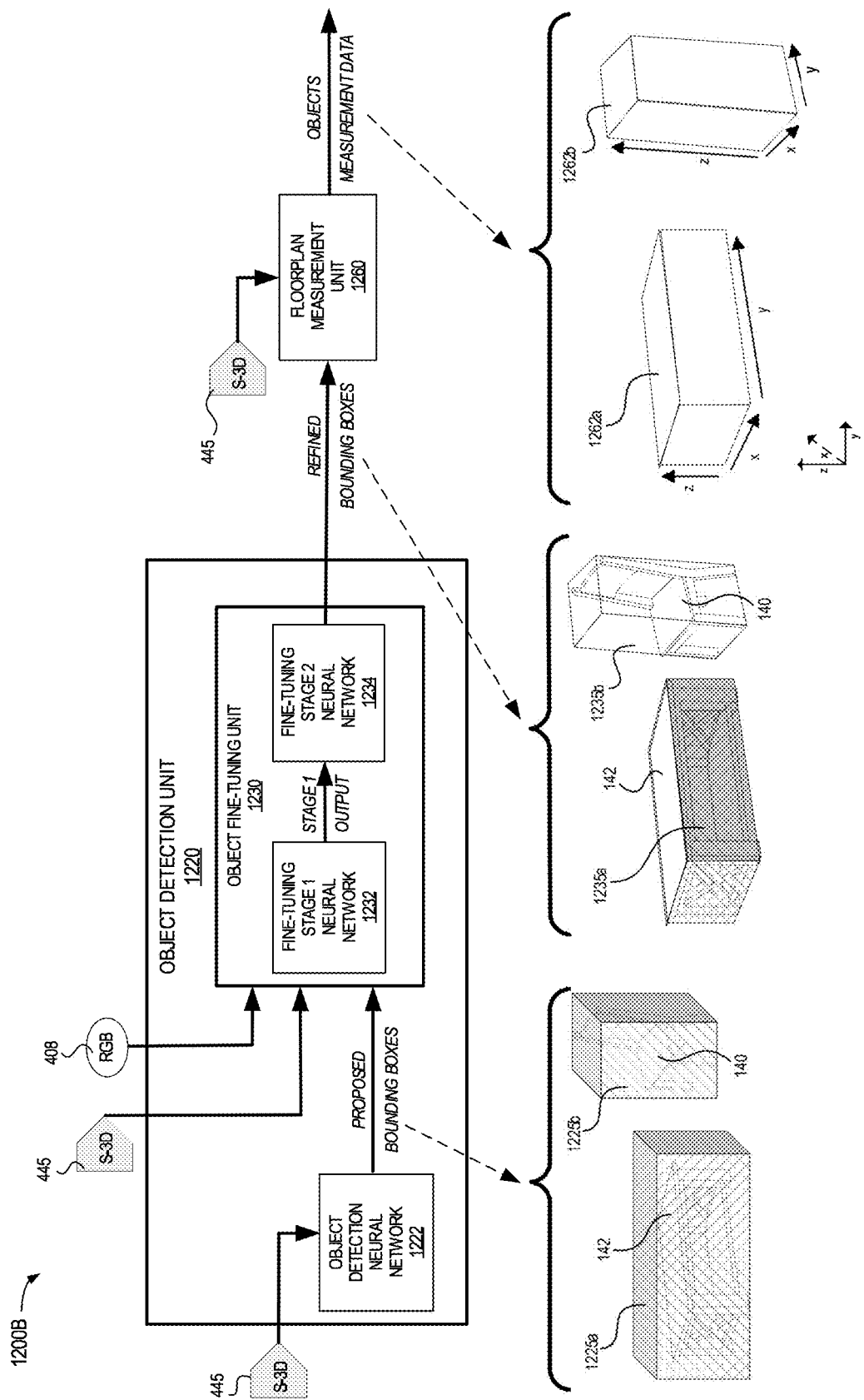
FIG. 12B is a system flow diagram of an example generation of measurements of 3D bounding boxes representing measurements of corresponding objects according to some implementations.

FIG. 12B is a system flow diagram of an example environment 1200B in which an object detection unit 1220 can generate refined bounding boxes for associated identified objects based on a 3D representation of the physical environment, and a floorplan measurement unit 1250 can provide measurements of said bounding boxes. In some implementations, the system flow of the example environment 1200B is performed on a device (e.g., server 110 or device 120 of FIGS. 1-3), such as a mobile device, desktop, laptop, or server device. In some implementations, the system flow of the example environment 1200B is performed on processing logic, including hardware, firmware, software, or a combination thereof. In some implementations, the system flow of the example environment 1200B is performed on a processor executing code stored in a non-transitory computer-readable medium (e.g., a memory).

The object detection unit 1220 includes an object detection neural network 1222 and an object fine-tuning unit 1230 that includes a fine-tuning stage 1 neural network 1232 and a fine-tuning stage 2 neural network 1234. The system flow of the example environment 1200B begins where the object detection unit 1220 acquires a semantic 3D representation (e.g., semantic 3D representation 445), which includes 3D data of identified walls, at the object detection neural network 1222 which generates proposed bounding boxes 1225a and 1225b of the identified objects (e.g., table 142 and chair 140, respectively). The proposed bounding boxes 1225a and 1225b are then refined by the object fine-tuning unit 1230 using a two-stage neural network. The fine-tuning stage 1 neural network 1232 acquires the semantic 3D representation data, light intensity image data (e.g., light intensity image data 408), and the proposed bounding boxes 1225a and 1225b and generates a stage 1 output. The fine-tuning stage 1 neural network 1234 uses a neural network to identify features of the object using low precision/high recall network to generate features of the object. The 3D data, light intensity image data, proposed bounding boxes 1225a, 1225b, and the stage 1 output are obtained by the fine-tuning stage 2 neural network 1234 that generates refined bounding boxes using high precision/low recall neural network to refine the accuracy of the generated features and output refined bounding boxes 1235a and 1235b (e.g., table 142 and chair 140, respectively). As illustrated in FIG. 12B, the refined bounding boxes 1235a and 1235b are more accurate than the bounding boxes 1225a and 1225b, respectively. The refined bounding boxes 1235a and 1235b are then sent to the floorplan measurement unit 1250 (e.g., measurement unit 248 of FIG. 2, and/or measurement unit 348 of FIG. 3). The floorplan measurement unit 1250 obtains the semantic 3D representation (e.g., semantic 3D representation 445) for the associated bounding boxes and determines measurements of each received bounding box (e.g., bounding box 1262a and 1262b) associated with a particular object include a length, a width, and a height that correspond to a length, a width, and a height of the particular object. For example, the length, width, and height of a table (e.g., table 142) or chair (e.g., chair 140).

There are several implementations in which the bounding box measurements may be shown overlain in the composite image, e.g., by showing the edges and vertices of the bounding volume, and/or by showing the surfaces of the bounding volume partially transparent so that the object and the bounding box are visible at the same time. In an exemplary embodiment, the spatial properties of the bounding box (e.g., length, height, and width) are displayed to the user automatically. Alternatively, the spatial properties are provided after a user interaction with the bounding box (e.g., selecting a bounding box icon or other selectable icon on the screen).

In some implementations, the image composition pipeline may include virtual content (e.g., a virtual box placed on the table 135 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        obtaining a three-dimensional (3D) representation of a physical environment that was generated based on depth data and light intensity image data;
        determining 3D positions of wall structures based on the 3D representation;
        determining 3D positions of 3D bounding boxes corresponding to objects in the physical environment;
        generating a floorplan based on:
            the 3D positions of the wall structures; and
            the 3D positions of the 3D bounding boxes corresponding to the objects; and
        providing the floorplan for display.

2. The method of claim 1, wherein determining the 3D positions of the wall structures in the physical environment based on the 3D representation comprises:
    identifying walls and wall attributes of the physical environment from the wall structures based on the 3D representation; and
    generating an edge map of the identified walls based on the 3D representation, wherein the floorplan is based on the generated edge map that includes the identified walls and the identified wall attributes.

3. The method of claim 2, further comprising:
    classifying corners and small walls based on the 3D representation using a more computationally intensive neural network;
    generating a transitional floorplan based on the classified corners and small walls;
    determining refinements for the transitional floorplan using a standardization algorithm; and
    generating a final floorplan of the physical environment based on the determined refinements for the transitional floorplan.

4. The method of claim 2, further comprising:
    determining boundaries for the wall structures using a wall structure neural network and light intensity image data; and
    generating refined boundaries using a polygon heuristics algorithm based on 3D semantic data associated with the identified wall attributes.

5. The method of claim 1, wherein the 3D bounding boxes are refined 3D bounding boxes, wherein generating a refined 3D bounding box for an identified object comprises:
    generating a proposed 3D bounding box using a first neural network; and
    generating the refined 3D bounding box by identifying features of the identified object using a second neural network and refining the proposed 3D bounding box using a third neural network based on the identified features.

6. The method of claim 5, wherein the first neural network generates the proposed 3D bounding box based on the 3D representation associated with the identified object.

7. The method of claim 5, wherein the second neural network identifies the features of the identified object based on the 3D representation associated with the identified object and light intensity image data.

8. The method of claim 5, wherein the third neural network is trained to refine accuracy of the identified features from the second neural network and output a refined 3D bounding box based on the 3D representation associated with the identified object and light intensity image data.

9. The method of claim 1, wherein the 3D bounding boxes provide location information, pose information, and shape information for the objects in the physical environment.

10. The method of claim 1, wherein the 3D representation is associated with 3D semantic data that includes a 3D point cloud that includes semantic labels associated with at least a portion of 3D points within the 3D point cloud.

11. The method of claim 10, wherein the semantic labels identify walls, wall structures, objects, and classifications of the identified objects of the physical environment.

12. A device comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the one or more processors to perform operations comprising:
        obtaining a three-dimensional (3D) representation of a physical environment that was generated based on depth data and light intensity image data;
        determining 3D positions of wall structures based on the 3D representation;
        determining 3D positions of 3D bounding boxes corresponding to objects in the physical environment;
        generating a floorplan based on:
            the 3D positions of the wall structures; and
            the 3D positions of the 3D bounding boxes corresponding to the objects; and
        providing the floorplan for display.

13. The device of claim 12, wherein determining the 3D positions of the wall structures in the physical environment based on the 3D representation comprises:
    identifying walls and wall attributes of the physical environment from the wall structures based on the 3D representation; and
    generating an edge map of the identified walls based on the 3D representation, wherein the floorplan is based on the generated edge map that includes the identified walls and the identified wall attributes.

14. The device of claim 13, wherein the operations further include:
    classifying corners and small walls based on the 3D representation using a more computationally intensive neural network;
    generating a transitional floorplan based on the classified corners and small walls;
    determining refinements for the transitional floorplan using a standardization algorithm; and
    generating a final floorplan of the physical environment based on the determined refinements for the transitional floorplan.

15. The device of claim 13, wherein the operations further include:
- determining boundaries for the wall structures using a wall structure neural network and light intensity image data; and
- generating refined boundaries using a polygon heuristics algorithm based on 3D semantic data associated with the identified wall attributes.

16. The device of claim 12, wherein the 3D bounding boxes are refined 3D bounding boxes, wherein generating a refined 3D bounding box for an identified object comprises:
- generating a proposed 3D bounding box using a first neural network; and
- generating the refined 3D bounding box by identifying features of the identified object using a second neural network and refining the proposed 3D bounding box using a third neural network based on the identified features.

17. The device of claim 12, wherein the 3D representation is associated with 3D semantic data that includes a 3D point cloud that includes semantic labels associated with at least a portion of 3D points within the 3D point cloud.

18. A non-transitory computer-readable storage medium, storing program instructions executable on a device to perform operations comprising:
- obtaining a three-dimensional (3D) representation of a physical environment that was generated based on depth data and light intensity image data;
- determining 3D positions of wall structures based on the 3D representation;
- determining 3D positions of 3D bounding boxes corresponding to objects in the physical environment;
- generating a floorplan based on:
  - the 3D positions of the wall structures; and
  - the 3D positions of the 3D bounding boxes corresponding to the objects; and
- providing the floorplan for display.

19. The non-transitory computer-readable storage medium of claim 18, wherein determining the 3D positions of the wall structures in the physical environment based on the 3D representation comprises:
- identifying walls and wall attributes of the physical environment from the wall structures based on the 3D representation; and
- generating an edge map of the identified walls based on the 3D representation, wherein the floorplan is based on the generated edge map that includes the identified walls and the identified wall attributes.

20. The non-transitory computer-readable storage medium of claim 19, wherein the operations further include:
- classifying corners and small walls based on the 3D representation using a more computationally intensive neural network;
- generating a transitional floorplan based on the classified corners and small walls;
- determining refinements for the transitional floorplan using a standardization algorithm; and
- generating a final floorplan of the physical environment based on the determined refinements for the transitional floorplan.

* * * * *